US011440810B2

United States Patent
Fujimoto

(10) Patent No.: US 11,440,810 B2
(45) Date of Patent: Sep. 13, 2022

(54) POWDER OF β-IRON OXYHYDROXIDE-BASED COMPOUND, β-IRON OXYHYDROXIDE-BASED COMPOUND SOL, MANUFACTURING METHOD OF POWDER OF ε-IRON OXIDE-BASED COMPOUND, AND MANUFACTURING METHOD OF MAGNETIC RECORDING MEDIUM

(71) Applicant: FUJIFILM Corporation, Tokyo (JP)

(72) Inventor: Takashi Fujimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 450 days.

(21) Appl. No.: 16/548,307

(22) Filed: Aug. 22, 2019

(65) Prior Publication Data

US 2020/0071188 A1 Mar. 5, 2020

(30) Foreign Application Priority Data

Aug. 28, 2018 (JP) .............................. JP2018-159195

(51) Int. Cl.
*H01F 1/11* (2006.01)
*H01F 1/00* (2006.01)
*C01G 49/06* (2006.01)
*G11B 5/852* (2006.01)

(52) U.S. Cl.
CPC .............. *C01G 49/06* (2013.01); *G11B 5/852* (2013.01); *C01P 2002/72* (2013.01); *C01P 2004/04* (2013.01); *C01P 2006/42* (2013.01)

(58) Field of Classification Search
CPC .. H01F 1/11; H01F 1/112; H01F 1/113; H01F 1/0054; H01F 1/00; C01G 49/06; C01G 49/02; C01G 49/0018; C01G 49/009; G11B 5/852; C01P 2002/72; C01P 2002/52; C01P 2004/32; C01P 2004/84; C01P 2004/04; C01P 2004/64; C01P 2006/42; B82Y 40/00; B82Y 25/00
See application file for complete search history.

(56) References Cited

U.S. PATENT DOCUMENTS

| | | | | |
|---|---|---|---|---|
| 4,014,710 | A * | 3/1977 | Woditsch | G11B 5/70668 |
| 9,663,434 | B1 * | 5/2017 | Shaikh | B01J 31/0271 |
| 2005/0252863 | A1 * | 11/2005 | Wurth | B01J 20/28004 |
| | | | | 210/681 |
| 2018/0033528 | A1 | 2/2018 | Sakane et al. | |

FOREIGN PATENT DOCUMENTS

| EP | 3309128 A1 | 4/2018 |
|---|---|---|
| JP | 2014-224027 A | 12/2014 |

OTHER PUBLICATIONS

Ohkoshi et al., "Multimetal-Substituted Epsilon-Iron Oxide ε-$G_{0.31}$ $Ti_{0.05}Co_{0.05}Fe_{1.59}O_3$ for Next-Generation Magnetic Recording Tape in the Big-Data Era", Magnetic Materials, Angew. Chem. Int. Ed., vol. 55, No. 38, pp. 11403-11406, 4 pages total (Aug. 24, 2016).
Extended European Search Report dated Jan. 31, 2020 from the European Patent Office in Application No. 19191635.2.
Notice of Reasons for Refusal dated Aug. 3, 2021 from the Japanese Patent Office in Japanese Application 2018-159195.

* cited by examiner

*Primary Examiner* — Matthew E. Hoban
*Assistant Examiner* — Lynne Edmondson
(74) *Attorney, Agent, or Firm* — Sughrue Mion, PLLC

(57) ABSTRACT

Provided is a powder of a β-iron oxyhydroxide-based compound that is a group of particles of a β-iron oxyhydroxide-based compound represented by Formula (1) below; in which a surface of the particles of the β-iron oxyhydroxide-based compound is modified with a surface modifier; in which, in a case where the powder is dispersed in water to be made into a sol, a zeta potential of the powder is equal to or higher than +5 mV at pH 10; and $$\beta\text{-}A_a Fe_{1-a} OOH \qquad (1)$$

in which, in Formula (1), A represents at least one metallic element other than Fe, and a represents a number that satisfies a relationship of 0≤a<1.

4 Claims, No Drawings

POWDER OF β-IRON OXYHYDROXIDE-BASED COMPOUND, β-IRON OXYHYDROXIDE-BASED COMPOUND SOL, MANUFACTURING METHOD OF POWDER OF ε-IRON OXIDE-BASED COMPOUND, AND MANUFACTURING METHOD OF MAGNETIC RECORDING MEDIUM

CROSS-REFERENCE TO RELATED APPLICATIONS

This application claims priority under 35 USC 119 from Japanese Patent Application No. 2018-159195 filed on Aug. 28, 2018, the disclosure of which is incorporated by reference herein in its entirety.

BACKGROUND OF THE INVENTION

1. Field of the Invention

The present disclosure relates to a powder of a β-iron oxyhydroxide-based compound, a β-iron oxyhydroxide-based compound sol, a manufacturing method of a powder of an ε-iron oxide-based compound, and a manufacturing method of a magnetic recording medium.

2. Description of the Related Art

In recent years, with the improvement of the performance of magnetic recording media, as a magnetic material used in the magnetic recording media, particles of ε-type iron oxide (hereinafter, referred to as "ε—$Fe_2O_3$" or "ε-iron oxide" as well), which are nanosized particles but express extremely high coercivity, have drawn attention.

As a method for manufacturing the ε-iron oxide particles, a method is known in which particles of β-type iron oxyhydroxide (hereinafter, referred to as "β-FeOOH" or "β-iron oxyhydroxide" as well) are used as a raw material.

For example, JP2014-224027A discloses a method for manufacturing single-phase ε-iron oxide nano magnetic particles from a sol of β-iron oxyhydroxide compound nano magnetic particles having an average particle diameter of about 6 nm.

SUMMARY OF THE INVENTION

In recent years, there has been a demand for a magnetic recording medium from which a high Signal to Noise Ratio (SNR) is obtained even in a case where a high sensitivity reproducing head such as a Magneto-Resistance (MR) head is used for reproduction. However, unfortunately, the magnetic recording medium, in which ε-iron oxide particles are used as a raw material, has low SNR due to a wide Switching field distribution (SFD).

Incidentally, in a case where ε-iron oxide particles are used as a magnetic material in a magnetic recording medium, from the viewpoint of realizing high SNR, it is important for the ε-iron oxide particles to be small. However, in a magnetic tape, which is one of the magnetic recording media, in a case where the ε-iron oxide particles are small, unfortunately, the film hardness of a magnetic layer containing the ε-iron oxide particles is reduced.

In order to solve the above problems, the inventors of the present invention paid attention to β-iron oxyhydroxide particles which are a raw material of ε-iron oxide particles, and repeated various examinations. As a result, it has been revealed that the zeta potential of the β-iron oxyhydroxide is effectively controlled.

An object to be achieved by an embodiment of the present invention is to provide a powder of β-iron oxyhydroxide-based compound capable of forming a magnetic powder which makes it possible to manufacture a magnetic recording medium having excellent SNR and excellent in the film hardness of a magnetic layer.

An object to be achieved by another embodiment of the present invention is to provide a β-iron oxyhydroxide-based compound sol capable of forming a magnetic powder which makes it possible to manufacture a magnetic recording medium having excellent SNR and excellent in the film hardness of a magnetic layer.

An object to be achieved by still another embodiment of the present invention is to provide a manufacturing method of a powder of an ε-iron oxide-based compound capable of forming a magnetic powder which makes it possible to manufacture a magnetic recording medium having excellent SNR and excellent in the film hardness of a magnetic layer.

An object to be achieved by yet another embodiment of the present invention is to provide a manufacturing method of a magnetic recording medium having excellent SNR and excellent in the film hardness of a magnetic layer.

Means for achieving the aforementioned objects include the following aspects.

<1> A powder of a β-iron oxyhydroxide-based compound that is a group of particles of a β-iron oxyhydroxide-based compound represented by Formula (1) below; in which a surface of the particles of the β-iron oxyhydroxide-based compound is modified with a surface modifier; in which, in a case where the powder is dispersed in water to be made into a sol, a zeta potential of the powder is equal to or higher than +5 mV at pH 10.

$$\beta\text{-}A_aFe_{1-a}OOH \qquad (1)$$

In Formula (1), A represents at least one metallic element other than Fe, and a represents a number that satisfies a relationship $0 \le a < 1$.

<2> The powder of a β-iron oxyhydroxide-based compound according to <1>, in which the surface modifier is a compound having: at least one anionic group selected from the group consisting of a phenolic hydroxyl group, a carboxy group, a phosphonic acid group, a sulfonic acid group, and a thiol group; and at least one cationic group selected from the group consisting of a primary amino group, a secondary amino group, a tertiary amino group, and a quaternary ammonium group.

<3> The powder of a β-iron oxyhydroxide-based compound according to <1> or <2>, in which the surface modifier is a compound having: a catechol skeleton; and at least one cationic group selected from the group consisting of a primary amino group, a secondary amino group, a tertiary amino group, and a quaternary ammonium group.

<4> The powder of a β-iron oxyhydroxide-based compound according to any one of <1> to <3>, in which the surface modifier is at least one compound selected from the group consisting of dopamine hydrochloride, adrenaline hydrochloride, isoproterenol hydrochloride, and arginine.

<5> The powder of a β-iron oxyhydroxide-based compound according to any one of <1> to <4>, in which, in Formula (1), A represents at least one metallic element selected from the group consisting of Ga, Al, In, Rh, Mn, Co, Ni, Zn, Ti, and Sn, and a represents a number that satisfies a relationship of $0 < a < 1$.

<6> The powder of a β-iron oxyhydroxide-based compound according to any one of <1> to <5>, being used for manufacturing a magnetic powder.

<7> A β-iron oxyhydroxide-based compound sol: in which a powder that is a group of particles of a β-iron oxyhydroxide-based compound represented by Formula (1) below is dispersed in water; in which a surface of the particles of the β-iron oxyhydroxide-based compound is modified with a surface modifier; in which a zeta potential of the powder of the β-iron oxyhydroxide-based compound is equal to or higher than +5 mV at pH 10.

$$\beta\text{-}A_a Fe_{1-a}OOH \tag{1}$$

In Formula (1), A represents at least one metallic element other than Fe, and a represents a number that satisfies a relationship of 0≤a<1.

<8> The β-iron oxyhydroxide-based compound sol according to <7>, in which the surface modifier is a compound having: at least one anionic group selected from the group consisting of a phenolic hydroxyl group, a carboxy group, a phosphonic acid group, a sulfonic acid group, and a thiol group; and at least one cationic group selected from the group consisting of a primary amino group, a secondary amino group, a tertiary amino group, and a quaternary ammonium group.

<9> The β-iron oxyhydroxide-based compound sol according to <7> or <8>, in which the surface modifier is a compound: having a catechol skeleton; and at least one cationic group selected from the group consisting of a primary amino group, a secondary amino group, a tertiary amino group, and a quaternary ammonium group.

<10> The β-iron oxyhydroxide-based compound sol according to any one of <7> to <9>, in which the surface modifier is at least one compound selected from the group consisting of dopamine hydrochloride, adrenaline hydrochloride, isoproterenol hydrochloride, and arginine.

<11> The β-iron oxyhydroxide-based compound sol according to any one of <7> to <10>, in which, in Formula (1), A represents at least one metallic element selected from the group consisting of Ga, Al, In, Rh, Mn, Co, Ni, Zn, Ti, and Sn, and a represents a number that satisfies a relationship of 0<a<1.

<12> The β-iron oxyhydroxide-based compound sol according to any one of <7> to <11>, being used for manufacturing a magnetic powder.

<13> A manufacturing method of a powder of an ε-iron oxide-based compound, including: mixing (i) a β-iron oxyhydroxide-based compound sol, in which the powder of the β-iron oxyhydroxide-based compound according to any one of <1> to <6> is dispersed in water, or the β-iron oxyhydroxide-based compound sol according to any one of <7> to <12> with (ii) a silane compound having a hydrolyzable group, to obtain a precursor powder dispersion liquid; extracting a precursor powder from the precursor powder dispersion liquid; subjecting the precursor powder to a heat treatment at a temperature of from 800° C. to 1,400° C. to obtain a heat-treated powder; and mixing the heat-treated powder with an aqueous alkali solution.

<14> A manufacturing method of a magnetic recording medium, including: preparing a composition for forming a magnetic layer by using the powder of the ε-iron oxide-based compound obtained by the manufacturing method according to <13>; applying the composition for forming a magnetic layer onto a non-magnetic support to form a layer of the composition for forming a magnetic layer; subjecting the layer of the composition for forming a magnetic layer formed as above to a magnetic field alignment treatment; and drying the layer of the composition for forming a magnetic layer that has been subjected to the magnetic field alignment treatment, to form a magnetic layer.

According to an embodiment of the present invention, there is provided a powder of a β-iron oxyhydroxide-based compound capable of forming a magnetic powder which makes it possible to manufacture a magnetic recording medium having excellent SNR and excellent in the film hardness of a magnetic layer.

According to another embodiment of the present invention, there is provided a β-iron oxyhydroxide-based compound capable of forming a magnetic powder which makes it possible to manufacture a magnetic recording medium having excellent SNR and excellent in the film hardness of a magnetic layer.

According to still another embodiment of the present invention, there is provided a manufacturing method of a powder of an ε-iron oxide-based compound capable of forming a magnetic powder which makes it possible to manufacture a magnetic recording medium having excellent SNR and excellent in the film hardness of a magnetic layer.

According to yet another embodiment of the present invention, there is provided a manufacturing method of a magnetic recording medium having excellent SNR and excellent in the film hardness of a magnetic layer.

DESCRIPTION OF THE PREFERRED EMBODIMENTS

Hereinafter, an example of a powder of a β-iron oxyhydroxide-based compound, a β-iron oxyhydroxide-based compound sol, a manufacturing method of a powder of an ε-iron oxide-based compound, and a manufacturing method of a magnetic recording medium to which the present invention is applied will be described. However, the present invention is not limited to the following embodiment. Within the intended scoped of the present invention, the present invention can be embodied by adding modification as appropriate.

In the present disclosure, a range of numerical values described using "to" means a range including the numerical values listed before and after "to" as a minimum value and a maximum value respectively.

Regarding the ranges of numerical values stepwise described in the present disclosure, the upper limit or the lower limit described in a certain range of numerical values may be substituted with the upper limit or the lower limit of another range of numerical values stepwise described. Furthermore, regarding the range of numerical values described in the present disclosure, the upper limit or the lower limit described in a certain range of numerical values may be substituted with the values described in Examples.

In the present disclosure, a combination of two or more preferred aspects is a more preferred aspect.

In the present disclosure, in a case where there is a plurality of kinds of substances that correspond to each component, unless otherwise specified, the amount of each component means the total amount of the plurality of kinds of substances.

In the present disclosure, the term "step" includes not only an independent step but also a step which is not apparently distinguishable from other steps as long as the intended object thereof is achieved.

In the present disclosure, "modifying a surface of the particles with a surface modifier" means that the surface modifier is adsorbed onto at least a portion of the surface of the particles.

[Powder of β-Iron Oxyhydroxide-Based Compound and β-Iron Oxyhydroxide-Based Compound Sol]

The powder of a β-iron oxyhydroxide-based compound of the present disclosure is a group of particles of a ρ3-iron oxyhydroxide-based compound represented by Formula (1) which will be described later; in which a surface of the particles of the β-iron oxyhydroxide-based compound is modified with a surface modifier; in a case where the powder is dispersed in water to be made into a sol, a zeta potential of the powder is equal to or higher than +5 mV at pH 10.

The β-iron oxyhydroxide-based compound sol of the present disclosure is a solin which a powder that is a group of the particles of the β-iron oxyhydroxide-based compound represented by Formula (1) that will be described later is dispersed in water; in which a surface of the particles of the β-iron oxyhydroxide-based compound is modified with a surface modifier; and in which a zeta potential of the powder of the β-iron oxyhydroxide-based compound is equal to or higher than +5 mV at pH 10.

As described above, although ε-iron oxide particles are nanosized fine particles, they express extremely high coercivity. Therefore, the ε-iron oxide particles are drawing attention as a magnetic material. However, unfortunately, in a case where magnetization reversal occurs in a magnetic recording medium in which the ε-iron oxide particles are used as a magnetic material, because the distribution of the values of magnetic field (SFD) is wide, noise increases, and hence SNR is reduced. In a magnetic tape which is a sort of magnetic recording medium, from the viewpoint of realizing high SNR, ε-iron oxide is used by being made into fine particles. However, unfortunately, in a case where the ε-iron oxide particles are too small, the film quality of a magnetic layer containing the ε-iron oxide particles deteriorates.

Accordingly, in a magnetic recording medium in the related art in which ε-iron oxide particles are used as a magnetic material, it is difficult to achieve both the excellent SNR and excellent film hardness.

In order to solve the above problems, the inventors of the present invention paid attention to particles of a ρ3-iron oxyhydroxide-based compound as a raw material ε-iron oxide particles, and repeated research. As a result, the inventors have found that by controlling the zeta potential of the particles of the β-iron oxyhydroxide compound, it is possible to form magnetic particles (that is, ε-iron oxide particles) capable of realizing high SNR without reducing the film hardness of a magnetic layer.

Generally, in an alkali range (for example pH equal to or higher than 9), the zeta potential of the particles of the β-iron oxyhydroxide-based compound is negative. In the present disclosure, a surface of the particles of the β-iron oxyhydroxide-based compound is modified with a surface modifier such that the particles of the β-iron oxyhydroxide-based compound has a positive zeta potential even in an alkali range.

Specifically, for the powder of the β-iron oxyhydroxide-based compound of the present disclosure, a surface of the particles of the β-iron oxyhydroxide-based compound represented by Formula (1), which will be described later, was modified with a surface modifier, such that the zeta potential of the powder of the β-iron oxyhydroxide-based compound became equal to or higher than +5 mV at pH 10 in a case where the particles were dispersed in water to be made into a sol. Furthermore, for the β-iron oxyhydroxide-based compound sol of the present disclosure, a surface of the particles of the β-iron oxyhydroxide-based compound represented by Formula (1), which will be described later, was modified with a surface modifier, such that the zeta potential of the powder of the β-iron oxyhydroxide-based compound became equal to or higher than +5 mV at pH 10. In this way, in a magnetic recording medium in which the ε-iron oxide particles were used as a magnetic material, both the excellent SNR and excellent film hardness were achieved.

It is unclear why the powder of the β-iron oxyhydroxide-based compound and the β-iron oxyhydroxide-based compound sol of the present disclosure bring about the effects described above. According to the inventors of the present invention, the reason is assumed to be as below.

In a case where the zeta potential of the particles of the β-iron oxyhydroxide-based compound is positive in an alkali range, at the time of covering the particles of the β-iron oxyhydroxide-based compound with a Si-containing coat in an ε-iron oxide particle manufacturing process, the interaction between the particles of the β-iron oxyhydroxide-based compound and Si is further enhanced. As a result, the surface of the particles of the β-iron oxyhydroxide-based compound tends to be coated with the Si-containing coat almost more uniformly than in the related art. Although the Si-containing coat is removed in the ε-iron oxide particle manufacturing process, it is considered that the coat may not be totally removed and remain on the surface of the ε-iron oxide particles almost uniformly as a thin film. In a case where the Si-containing coat almost uniformly remains on the surface of the ε-iron oxide particles, even though the ε-iron oxide particles are dispersed in a dispersion medium at the time of preparing a composition for forming a magnetic layer, the ε-iron oxide particles hardly suffer damage such as breakage. In a case where the ε-iron oxide particles are broken, in the magnetic recording medium, SFD is increased, and SNR is reduced. However, according to the powder of the β-iron oxyhydroxide-based compound and the β-iron oxyhydroxide-based compound sol of the present disclosure, ε-iron oxide particles that are hardly broken can be formed. Presumably, for this reason, in the magnetic recording medium, SFD may be hardly increased, and excellent SNR could be realized. In addition, presumably, because the ε-iron oxide particles are hardly broken, the magnetic layer may be hardly peeled off, and the film hardness of the magnetic layer may be excellent.

Regarding the points described above, in JP2014-224027A, ε-iron oxide nano magnetic particles are manufactured from a sol of β-iron oxyhydroxide nano magnetic particles. However, JP2014-224027A does not pay attention to the control of the zeta potential of the particles of the β-iron oxyhydroxide. Furthermore, JP2014-224027A does not describe a technique of causing the particles of the β-iron oxyhydroxide to exhibit a positive zeta potential in an alkali range so as to form a magnetic powder which makes it possible to manufacture a magnetic recording medium having excellent SNR and excellent in the film hardness of a magnetic layer.

The presumption described above does not limit the present invention and merely explains the present invention as an example.

[Use]

Both the powder of the β-iron oxyhydroxide-based compound and the β-iron oxyhydroxide-based compound sol of the present disclosure can be suitably used for manufacturing a magnetic powder.

With the β-iron oxyhydroxide-based compound sol obtained by dispersing the powder of the β-iron oxyhydroxide-based compound of the present disclosure in water, it is possible to manufacture a magnetic recording medium which exhibits excellent SNR and is excellent in the film hardness of a magnetic layer.

Furthermore, with the β-iron oxyhydroxide-based compound sol of the present invention, it is possible to manufacture a magnetic recording medium which exhibits excellent SNR and is excellent in the film hardness of a magnetic layer.

It is easy for the particles of β-type iron oxyhydroxide to form particles of ε-type iron oxide. Therefore, the powder of the β-iron oxyhydroxide-based compound and the β-iron oxyhydroxide-based compound sol of the present disclosure can be particularly suitably used for manufacturing a powder of an ε-iron oxide-based compound among magnetic powders.

[β3-Iron Oxyhydroxide-Based Compound]

The β-iron oxyhydroxide-based compound is a compound represented by Formula (1) below.

$$\beta\text{-}A_a Fe_{1-a}OOH \tag{1}$$

In Formula (1), A represents at least one metallic element other than Fe, and a represents a number that satisfies a relationship of $0 \leq a < 1$.

The compound represented by Formula (1) includes β-FeOOH and a compound formed in a case where a portion of an $Fe^{3+}$ ion site of β-FeOOH is substituted with a metallic element other than Fe.

In a case where a portion of the $Fe^{3+}$ ion site of β-FeOOH is substituted with a metallic element other than Fe, for example, at the time of forming particles of an ε-iron oxide-based compound, the magnetic characteristics of the ε-iron oxide-based compound can be preferably controlled.

As long as A in Formula (1) represents at least one metallic element other than Fe, the type of the metallic element and the number of the metallic elements are not particularly limited.

For example, from the viewpoint of more easily forming a crystal structure of ε-iron oxide and more easily stabilizing the formed crystal structure, A in Formula (1) preferably represents at least one metallic element selected from the group consisting of Ga, Al, In, Rh, Co, Ni, Mn, Zn, Ti, and Sn, more preferably at least one metallic element selected from the group consisting of Ga, Co, and Ti, and even more preferably contains Ga.

For example, from the viewpoint of the control of magnetic characteristics and the formability and stability of an ε phase, a in Formula (1) preferably represents a number that satisfies a relationship of $0 < a < 1$, more preferably represents a number that satisfies a relationship of $0 < a < 0.8$, and even more preferably represents a number that satisfies a relationship of $0.05 < a < 0.6$.

Among the compounds represented by Formula (1) below, a compound represented by Formula (2) below, a compound represented by Formula (3) below, a compound represented by Formula (4) below, a compound represented by Formula (5) below, and a compound represented by Formula (6) below are preferred aspects.

Among these, in view of easily realizing better SNR, the compound represented by Formula (6) below is preferable.

$$\beta\text{-}Z_z Fe_{1-z}OOH \tag{2}$$

In Formula (2), Z represents at least one trivalent metallic element selected from the group consisting of Ga, Al, In, and Rh. z represents a number that satisfies a relationship of $0 < z < 1$.

For example, from the viewpoint of the control of magnetic characteristics and the formability and stability of an E phase, Z in Formula (2) more preferably represents at least one metallic element selected from Ga or Al, and more preferably represents Ga.

For example, from the viewpoint of the control of magnetic characteristics and the formability and stability of an E phase, z in Formula (2) preferably represents a number that satisfies a relationship of $0 < z < 0.9$, and more preferably represents a number that satisfies a relationship of $0.05 < z < 0.6$.

Specific examples of the compound represented by Formula (2) include $\beta\text{-}Ga_{(0.12)}Fe_{(0.88)}OOH$, $\beta\text{-}Ga_{(0.25)}Fe_{(0.75)}OOH$, $\beta\text{-}Ga_{(0.275)}Fe_{(0.725)}OOH$, $\beta\text{-}Ga_{(0.3)}Fe_{(0.7)}OOH$, and the like.

$$\beta\text{-}X_x Y_y Fe_{1-x-y}OOH \tag{3}$$

In Formula (3), X represents at least one divalent metallic element selected from the group consisting of Co, Ni, Mn, and Zn, and Y represents at least one quadrivalent metallic element selected from Ti and Sn. x represents a number that satisfies a relationship of $0 < x < 0.5$, and y represents a number that satisfies a relationship of $0 < y < 0.5$.

For example, from the viewpoint of the control of magnetic characteristics and the formability and stability of an ε phase, X in Formula (3) preferably represents at least one metallic element selected from Co or Mn, and more preferably represents Co. From the same viewpoint as described above, Y in Formula (3) preferably represents Ti.

For example, from the viewpoint of the control of magnetic characteristics and the formability and stability of an ε phase, x and y in Formula (3) preferably represent numbers that satisfy relationships of $0 < x < 0.25$ and $0 < y < 0.25$ respectively.

Specific examples of the compound represented by Formula (3) include $\beta\text{-}Co_{(0.05)}Ti_{(0.05)}Fe_{(0.9)}OOH$, $\beta\text{-}Co_{(0.07)}Ti_{(0.07)}Fe_{(0.86)}OOH$, and the like.

$$\beta\text{-}X_x Z_z Fe_{1-x-z}OOH \tag{4}$$

In Formula (4), X represents at least one divalent metallic element selected from the group consisting of Co, Ni, Mn, and Zn, and Z represents at least one trivalent metallic element selected from the group consisting of Ga, Al, In, and Rh. x represents a number that satisfies a relationship of $0 < x < 0.5$, and z represents a number that satisfies a relationship of $0 < z < 0.5$.

For example, from the viewpoint of the control of magnetic characteristics and the formability and stability of an ε phase, X in Formula (4) preferably represents at least one metallic element selected from Co or Mn, and more preferably represents Co. From the same viewpoint as described above, Z in Formula (4) preferably represents at least one metallic element selected from Ga or Al, and more preferably represents Ga.

From the viewpoint of the control of magnetic characteristics and the formability and stability of an ε phase, x and z in Formula (4) preferably represent numbers that satisfy relationships of $0 < x < 0.25$ and $0 < z < 0.3$ respectively.

Specific examples of the compound represented by Formula (4) include $\beta\text{-}Ga_{(0.25)}Co_{(0.05)}Fe_{(0.7)}OOH$, $\beta\text{-}Ga_{(0.3)}Co_{(0.05)}Fe_{(0.65)}OOH$, and the like.

$$\beta\text{-}Y_y Z_z Fe_{1-y-z}OOH \tag{5}$$

In Formula (5), Y represents at least one quadrivalent metallic element selected from Ti and Sn, and Z represents at least one trivalent metallic element selected from the group consisting of Ga, Al, In, and Rh. y represents a number that satisfies a relationship of $0 < y < 0.5$, and z represents a number that satisfies a relationship of $0 < z < 0.5$.

For example, from the viewpoint of the control of magnetic characteristics and the formability and stability of an ε phase, Y in Formula (5) preferably represents Ti. From the same viewpoint as described above, Z in Formula (5) preferably represents at least one metallic element selected from Ga or Al, and more preferably represents Ga.

For example, from the viewpoint of the control of magnetic characteristics and the formability and stability of an ε phase, y and z in Formula (5) preferably represent numbers that satisfy relationships of $0<y<0.25$ and $0<z<0.3$ respectively.

Specific examples of the compound represented by Formula (5) include $\beta\text{-Ga}_{(0.3)}\text{Ti}_{(0.05)}\text{Fe}_{(0.65)}\text{OOH}$, $\beta\text{-Ga}_{(0.25)}\text{Ti}_{(0.05)}\text{Fe}_{(0.7)}\text{OOH}$, and the like.

$$\beta\text{-}X_xY_yZ_z\text{Fe}_{1-x-y-z}\text{OOH} \qquad (6)$$

In Formula (6), X represents at least one divalent metallic element selected from the group consisting of Co, Ni, Mn, and Zn, Y represents at least one quadrivalent metallic element selected from Ti and Sn, and Z represents at least one trivalent metallic element selected from the group consisting of Ga, Al, In, and Rh. x represents a number that satisfies a relationship of $0<x<0.5$, y represents a number that satisfies a relationship of $0<y<0.5$, z represents a number that satisfies a relationship of $0<z<0.5$, and $x+y+z<1$.

For example, from the viewpoint of the control of magnetic characteristics and the formability and stability of an ε phase, X in Formula (6) preferably represents at least one metallic element selected from Co or Mn, and more preferably represents Co. From the same viewpoint as described above, Y in Formula (6) preferably represents Ti. From the same viewpoint as described above, Z in Formula (6) preferably represents at least one metallic element selected from Ga or Al, and more preferably represents Ga.

For example, from the viewpoint of the control of magnetic characteristics and the formability and stability of an ε phase, x, y, and z in Formula (6) preferably represent numbers that satisfy relationships of $0<x<0.25$, $0<y<0.25$, and $0<z<0.3$ respectively, and more preferably represent numbers that satisfy relationships of $0<x<0.15$, $0<y<0.15$, and $0<z<0.3$ respectively.

Specific examples of the compound represented by Formula (6) include $\beta\text{-Ga}_{(0.12)}\text{Co}_{(0.025)}\text{Ti}_{(0.025)}\text{Fe}_{(0.83)}\text{OOH}$, $\beta\text{-Ga}_{(0.14)}\text{Co}_{(0.025)}\text{Ti}_{(0.025)}\text{Fe}_{(0.81)}\text{OOH}$, $\beta\text{-Ga}_{(0.15)}\text{Co}_{(0.025)}\text{Ti}_{(0.025)}\text{Fe}_{(0.8)}\text{OOH}$, $\beta\text{-Ga}_{(0.1)}\text{Co}_{(0.025)}\text{Ti}_{(0.025)}\text{Fe}_{(0.85)}\text{OOH}$, $\beta\text{-Ga}_{(0.25)}\text{Co}_{(0.005)}\text{Ti}_{(0.005)}\text{Fe}_{(0.74)}\text{OOH}$, $\beta\text{-Ga}_{(0.2)}\text{Co}_{(0.025)}\text{Ti}_{(0.0125)}\text{Fe}_{(0.775)}\text{OOH}$, $\beta\text{-Ga}_{(0.1325)}\text{Co}_{(0.025)}\text{Ti}_{(0.025)}\text{Fe}_{(0.8175)}\text{OOH}$, $\beta\text{-Ga}_{(0.125)}\text{Co}_{(0.25)}\text{Ti}_{(0.25)}\text{Fe}_{(0.825)}\text{OOH}$, $\beta\text{-Ga}_{(0.2)}\text{Co}_{(0.0175)}\text{Ti}_{(0.075)}\text{Fe}_{(0.765)}\text{OOH}$, $\beta\text{-Al}_{(0.13)}\text{CO}_{(0.025)}\text{Ti}_{(0.025)}\text{Fe}_{(0.82)}\text{OOH}$, and the like.

Whether the iron oxyhydroxide-based compound has a β-type crystal structure can be checked, for example, by an X-Ray-Diffraction (XRD) method.

As a measurement apparatus, for example, an X' Pert Pro diffractometer (trade name) manufactured by Malvern PANalytical can be suitably used, but the measurement apparatus is not limited to this.

Specifically, the measurement conditions are as below, for example.

—Measurement Conditions—
X-ray source: Cu Kα ray
[wavelength: 1.54 Å (0.154 nm), power: 40 mA, 45 kV]
Scan range: $20°<2\theta<70°$
Scan interval: 0.05°
Scan speed: 0.75°/min "β-Iron oxyhydroxide-based compound" in the present disclosure includes compounds in which a ratio of a crystal structure (for example, an α type, a γ type, and an δ type) other than the β type with respect to all the crystal structures is higher than 0% by mass and equal to or lower than 30% by mass. The ratio of the crystal structure other than the β type with respect to all the crystal structures is preferably equal to or lower than 20% by mass, more preferably equal to or lower than 10% by mass, and particularly preferably 0% by mass. That is, it is particularly preferable that the β-iron oxyhydroxide-based compound does not contain a crystal structure other than the β type.

The ratio of the crystal structure other than the β type is determined by multiphase Rietveld refinement using software such as RIETAN-FP.

The composition of the β-iron oxyhydroxide-based compound is checked by high-frequency Inductively Coupled Plasma (ICP) emission spectrometry.

Specifically, a container filled with 12 mg of a sample powder and 10 mL of a 4 mol/L (liter, the same shall be applied hereinafter) aqueous hydrochloric acid solution is kept for 3 hours on a hot plate with a set temperature of 80° C., thereby obtaining a solution. Then, the obtained solution is filtered using a 0.1 μm membrane filter. For the obtained filtrate, elemental analysis is performed using a high-frequency Inductively Coupled Plasma (ICP) emission spectrometer. Based on the obtained elemental analysis results, a content rate of each of the metal atoms with respect to iron atoms (100 at %) is determined. Based on the obtained content rate, the composition is checked.

As a measurement apparatus, for example, ICPS-8100 (trade name) from Shimadzu Corporation can be suitably used, but the measurement apparatus is not limited to this.

The shape of the particles of the β-iron oxyhydroxide-based compound is not particularly limited.

For example, the particles of the β-iron oxyhydroxide-based compound have a spherical shape, a rod shape, a needle shape, a flat plate shape, an amorphous shape, and the like. Generally, the particles have a rod shape.

The size of the particles of the β-iron oxyhydroxide-based compound is not particularly limited.

In the present disclosure, for example, in a case where the particles have a rod shape or a needle shape, the size of the particles of the β-iron oxyhydroxide-based compound is represented by the length of a major axis (so-called minor axis length) of the particles and a ratio of the length of the major axis to the length of a minor axis of the particles (major axis length/minor axis length: so-called aspect ratio). In a case where the particles have a spherical shape, a flat plate shape, or an amorphous shape, the size of the particles is represented by an equivalent circular diameter.

The average major axis length of the powder of the β-iron oxyhydroxide-based compound is not particularly limited, but is preferably within a range equal to or greater than 3 nm and equal to or smaller than 50 nm, more preferably within a range equal to or greater than 5 nm and equal to or smaller than 30 nm, and even more preferably within a range equal to or greater than 8 nm and equal to or smaller than 20 nm, for example.

In a case where the average major axis length of the powder of the β-iron oxyhydroxide-based compound is equal to or greater than 3 nm, a magnetic powder can be formed which makes it possible to manufacture a magnetic recording medium with further improved film hardness of a magnetic layer.

In a case where the average major axis length of the powder of the β-iron oxyhydroxide-based compound is equal to or smaller than 50 nm, a magnetic powder can be formed which makes it possible to manufacture a magnetic recording medium with better SNR.

In the present disclosure, "average major axis length of the powder of the β-iron oxyhydroxide-based compound" means a number-average major axis length of 500 primary particles of the β-iron oxyhydroxide-based compound. Furthermore, "average aspect ratio of the powder of the β-iron oxyhydroxide-based compound" means a ratio of a number-average major axis length (so-called average major axis length) of 500 primary particles of the β-iron oxyhydroxide-based compound to a number-average minor axis length (so-called average minor axis length) of 500 primary particles of the β-iron oxyhydroxide-based compound.

Specifically, the average major axis length and the average aspect ratio of the powder of the β-iron oxyhydroxide-based compound are determined by the following method.

By using a Transmission Electron Microscope (TEM), the powder of the iron oxyhydroxide-based compound is imaged at 80,000× magnification and printed on printing paper at a total magnification of 500,000×. From the printed particles, primary particles are selected, and the contour of the primary particles is traced using a digitizer. The primary particles mean independent particles not being aggregated. By using image analysis software, the major axis length and the minor axis length in the traced contour are determined.

For 500 particles randomly extracted from the primary particles printed on several sheets of printing paper, the major axis length and the minor axis length are determined. For each of the determined major axis lengths and the minor axis lengths of the 500 particles, a simple average (that is, a number average) is calculated, thereby determining the average major axis length and the average aspect ratio (average major axis length/average minor axis length).

As the transmission electron microscope, for example, a transmission electron microscope (model No.: H-9000) from Hitachi High-Technologies Corporation can be suitably used, but the transmission electron microscope is not limited to this.

As the image analysis software, for example, image analysis software (trade name: KS-400) manufactured by CARL ZEISS can be suitably used, but the image analysis software is not limited to this.

The average major axis length and the average aspect ratio of the powder of the β-iron oxyhydroxide-based compound can be controlled by the type of the metallic element to be substituted, the amount of a raw material and a reagent used for synthesis, the reaction temperature, the timing and speed for adding a raw material, the stirring speed, and the like.

For example, the major axis length of the particles of the β-iron oxyhydroxide-based compound can be increased by raising the reaction temperature and reduced by lowering the reaction temperature.

The average equivalent circular diameter of the powder of the β-iron oxyhydroxide-based compound is not particularly limited, but is preferably within a range equal to or greater than 5 nm and equal to or smaller than 30 nm, more preferably within a range equal to or greater than 6 nm and equal to or smaller than 20 nm, and even more preferably within a range equal to or greater than 7 nm and equal to or smaller than 15 nm, for example.

In a case where the average equivalent circular diameter of the powder of the β-iron oxyhydroxide-based compound is equal to or greater than 5 nm, a magnetic powder can be formed which makes it possible to manufacture a magnetic recording medium with a further improved film hardness of a magnetic layer.

In a case where the average equivalent circular diameter of the powder of the β-iron oxyhydroxide-based compound is equal to or smaller than 30 nm, a magnetic powder can be formed which makes it possible to manufacture a magnetic recording medium with better SNR.

In the present disclosure, "average equivalent circular diameter of the powder of the β-iron oxyhydroxide-based compound" means the average of equivalent circular diameters of 500 primary particles of the β-iron oxyhydroxide-based compound.

Specifically, the average equivalent circular diameter of the powder of the β-iron oxyhydroxide-based compound is determined by the following method.

By using a Transmission Electron Microscope (TEM), the powder of the β-iron oxyhydroxide-based compound is imaged at 80,000× magnification and printed on printing paper at a total magnification of 500,000×. From the printed particles, primary particles are selected, and the contour of the primary particles is traced using a digitizer. By using image analysis software, the diameter of a circle having the same area as the traced area (equivalent circular area diameter) is determined.

For 500 particles randomly extracted from the primary particles printed on several sheets of printing paper, the equivalent circular area diameter is calculated. A simple average (that is, a number average) is calculated for the obtained equivalent circular area diameters of the 500 particles, thereby determining the average equivalent circular diameter of the primary particles.

Examples of the transmission electron microscope and the image analysis software that are suitably used are as described above.

The average equivalent circular diameter of the powder of the β-iron oxyhydroxide-based compound can be controlled by the type of the metallic element to be substituted, the amount of a raw material and a reagent used for synthesis, the reaction temperature, the timing and speed for adding a raw material, the stirring speed, and the like.

For example, the equivalent circular diameter of the particles of the β-iron oxyhydroxide-based compound can be increased by raising the reaction temperature and reduced by lowering the reaction temperature.

[Surface Modifier]

The surface modifier is not particularly limited as long as it is a compound which causes the powder of the β-iron oxyhydroxide-based compound to have a zeta potential equal to or higher than +5 mV at pH 10 in a case where the powder is dispersed in water to be made into a sol, by modifying a surface of the particles of the β-iron oxyhydroxide-based compound represented by Formula (1) described above.

For example, from the viewpoint of controlling better the zeta potential of the powder of the β-iron oxyhydroxide-based compound, the surface modifier is preferably a compound having an anionic group, which is adsorbed onto the surface of the particles of the β-iron oxyhydroxide-based compound, and a cationic group, which positively charges the surface of the particles of the β-iron oxyhydroxide-based compound, in a molecule.

In a case where the surface modifier is the compound having the anionic group and the cationic group in a molecule, it is preferable that the surface modifier has at least the cationic group on a side chain.

In a case where the surface modifier is the compound having the anionic group and the cationic group in a molecule, the number of anionic groups and cationic groups described above is not particularly limited.

The surface modifier may have one anionic group and one cationic group or have two or more anionic groups and two or more cationic groups. Alternatively, the surface modifier may have one anionic group and two or more cationic groups or have one cationic group and two or more anionic groups.

Furthermore, the surface modifier may have one anionic group and one cationic group or have two or more anionic groups and two or more cationic groups. Alternatively, the surface modifier may have one anionic group and two or more cationic groups or have one cationic group and two or more anionic groups.

In the surface modifier, it is preferable that pKa of at least one anionic group is less than 10 and pKa of at least one cationic group is higher than 10. pKa in the present disclosure is calculated using ACD/pka DB ver 8.07 of ACD/Labs software Ver 8.0 for Microsoft windows from Advanced Chemistry Development.

Examples of the anionic group electrostatically adsorbed onto the surface of the particles of the β-iron oxyhydroxide-based compound include a phenolic hydroxyl group, a carboxy group, a phosphonic acid group, a sulfonic acid group, a thiol group, and the like.

Examples of the cationic group positively charging the surface of the particles of the β-iron oxyhydroxide-based compound include a primary amino group, a secondary amino group, a tertiary amino group, a quaternary ammonium group, and the like.

For example, from the viewpoint of controlling better the zeta potential of the powder of the β-iron oxyhydroxide-based compound, the surface modifier is preferably a compound having at least one anionic group selected from the group consisting of a phenolic hydroxyl group, a carboxy group, a phosphonic acid group, a sulfonic acid group, and a thiol group and at least one cationic group selected from the group consisting of a primary amino group, a secondary amino group, a tertiary amino group, and a quaternary ammonium group, more preferably a compound having a phenolic hydroxyl group and at least one cationic group selected from the group consisting of a primary amino group, a secondary amino group, a tertiary amino group, and a quaternary ammonium group, and even more preferably a compound having a catechol skeleton and at least one cationic group selected from the group consisting of a primary amino group, a secondary amino group, a tertiary amino group, and a quaternary ammonium group.

The molecular weight of the surface modifier is not particularly limited. For example, from the viewpoint of the adsorption efficiency with respect to the surface of the particles of the β-iron oxyhydroxide-based compound, the molecular weight of the surface modifier is preferably equal to or smaller than 1,000, more preferably equal to or smaller than 500, and even more preferably equal to or smaller than 250.

The lower limit of the molecular weight of the surface modifier is not particularly limited, and is preferably equal to or greater than 100 for example.

As the molecular weight of the surface modifier, a molecular weight determined from the chemical structure of a compound as the surface modifier is adopted.

Specific examples of the surface modifier include dopamine hydrochloride, adrenaline hydrochloride, isoproterenol hydrochloride, arginine, lysine, and the like.

Among these, as the surface modifier, for example, from the viewpoint of enabling the formation of a magnetic powder which makes it possible to manufacture a magnetic recording medium having better SNR and a further improved film hardness of a magnetic layer, at least one compound selected from the group consisting of dopamine hydrochloride, adrenaline hydrochloride, isoproterenol hydrochloride, and arginine is preferable, at least one compound selected from the group consisting of dopamine hydrochloride, adrenaline hydrochloride, and isoproterenol hydrochloride is more preferable, and at least one compound selected from adrenaline hydrochloride and isoproterenol hydrochloride is even more preferable.

The surface of the particles of the β-iron oxyhydroxide-based compound may be modified with one kind of surface modifier or two or more kinds of surface modifiers.

The content rate of the surface modifier in the powder of the β-iron oxyhydroxide-based compound of the present disclosure is not particularly limited.

For example, from the viewpoint of the dispersibility and the control of zeta potential, in the powder of the β-iron oxyhydroxide-based compound of the present disclosure, the content rate of the surface modifier with respect to the total mass of the particles of the β-iron oxyhydroxide-based compound represented by Formula (1) described above is preferably equal to or higher than 5% by mass and equal to or lower than 50% by mass, more preferably equal to or higher than 10% by mass and equal to or lower than 45% by mass, and even more preferably equal to or higher than 20% by mass and equal to or lower than 40% by mass.

In the β-iron oxyhydroxide-based compound sol of the present disclosure, the content rate of the surface modifier is not particularly limited.

For example, from the viewpoint of the dispersibility and the control of zeta potential, in the β-iron oxyhydroxide-based compound sol of the present disclosure, the content rate of the surface modifier with respect to the total mass of the particles of the β-iron oxyhydroxide-based compound represented by Formula (1) described above is preferably equal to or higher than 5% by mass and equal to or lower than 50% by mass, more preferably equal to or higher than 10% by mass and equal to or lower than 45% by mass, and even more preferably equal to or higher than 20% by mass and equal to or lower than 40% by mass.

Whether the surface of the particles of the β-iron oxyhydroxide-based compound is modified with the surface modifier can be checked, for example, by detecting carbon atoms, nitrogen atoms, and the like by means of organic elemental analysis such as a combustion method, X-ray Photoelectron Spectroscopy (XPS), and the like, or by heating-induced weight loss detected by Thermogravimetry (TG).

The surface modifier, with which the surface of the particles of the β-iron oxyhydroxide-based compound is modified, can be identified, for example, by detecting peaks of functional groups by using Infrared Spectroscopy (IR).

[Zeta Potential]

In a case where the powder of the β-iron oxyhydroxide-based compound of the present disclosure is dispersed in water to be made into a sol, the zeta potential thereof at pH 10 is equal to or higher than +5 mV, preferably equal to or higher than +10 mV, and more preferably equal to or higher than +15 mV.

In a case where the powder of the β-iron oxyhydroxide-based compound of the present disclosure is dispersed in water to be made into a sol, the zeta potential thereof is equal to or higher than +5 mV at pH 10. Therefore, the powder can form a magnetic powder which makes it possible to manufacture a magnetic recording medium having excellent SNR and excellent in the film hardness of a magnetic layer.

The upper limit of the zeta potential is not particularly limited, but is preferably equal to or lower than +50 mV for example.

At pH 10, the zeta potential of the powder of the β-iron oxyhydroxide-based compound in the β-iron oxyhydroxide-based compound sol of the present disclosure is equal to or higher than +5 mV, preferably equal to or higher than +10 mV, and more preferably equal to or higher than +15 mV.

The zeta potential of the powder of the β-iron oxyhydroxide-based compound in the β-iron oxyhydroxide-based compound sol of the present disclosure is equal to or higher than +5 mV at pH 10. Therefore, the sol can form a magnetic powder which makes it possible to manufacture a magnetic recording medium having excellent SNR and excellent in the film hardness of a magnetic layer.

The upper limit of the zeta potential is not particularly limited, but is preferably equal to or lower than +50 mV for example.

The zeta potential of the powder of the β-iron oxyhydroxide-based compound is a value measured by the following method.

The liquid temperature of the β-iron oxyhydroxide-based compound sol is adjusted to be 25° C. In a state where the liquid temperature is maintained, pH of the β-iron oxyhydroxide-based compound sol is adjusted to be 10 by using an aqueous alkali solution, thereby obtaining a sample for measurement. By using a zeta potential analyzer, the zeta potential of the obtained sample for measurement is measured.

The aqueous alkali solution for adjusting pH of the β-iron oxyhydroxide-based compound sol to be 10 is not particularly limited, and examples thereof include an aqueous ammonia solution, an aqueous sodium hydroxide (NaOH) solution, and the like.

As the zeta potential analyzer, for example, ZETASIZER NANO ZS (trade name) from Malvern Panalytical Ltd. can be suitably used, but the zeta potential analyzer is not limited to this.

[Viscosity of β-Iron Oxyhydroxide-Based Compound Sol]

The viscosity of the β-iron oxyhydroxide-based compound sol is not particularly limited. For example, from the viewpoint of the dispersibility and the temporal stability of dispersion, the viscosity of the β-iron oxyhydroxide-based compound sol is preferably equal to or higher than 0.5 Pa·s and equal to or lower than 5.0 Pa·s, more preferably equal to or higher than 0.5 Pa·s and equal to or lower than 3.0 Pa·s, and even more preferably equal to or higher than 0.5 Pa·s and equal to or lower than 2.0 Pa·s.

The viscosity of the β-iron oxyhydroxide-based compound sol is measured using a viscometer in a state where the temperature of the β-iron oxyhydroxide-based compound sol is adjusted to be 25° C. As the viscometer, for example, a vibration-type viscometer Vm-10 (trade name) from SEKONIC CORPORATION. can be suitably used, but the viscometer is not limited to this.

The content rate of the powder of the β-iron oxyhydroxide-based compound in the β-iron oxyhydroxide-based compound sol of the present disclosure is not particularly limited. For example, from the viewpoint of the uniformity of a reaction with a silane compound, the content rate of the powder of the β-iron oxyhydroxide-based compound with respect to the total mass of the β-iron oxyhydroxide-based compound sol is preferably equal to or higher than 0.01% by mass and equal to or lower than 5.0% by mass, more preferably equal to or higher than 0.05% by mass and equal to or lower than 1.0% by mass, and even more preferably equal to or higher than 0.1% by mass and equal to or lower than 0.5% by mass.

[Manufacturing Method of β-Iron Oxyhydroxide-Based Compound Sol]

The manufacturing method of a β-iron oxyhydroxide-based compound sol of the present disclosure includes a step of mixing an aqueous solution containing a compound having trivalent iron ions with an alkali agent so as to obtain a dispersion liquid of a powder of a β-iron oxyhydroxide-based compound represented by Formula (1) (hereinafter, referred to as "step (A)" as well), and a step of mixing the obtained dispersion liquid of the powder of the β-iron oxyhydroxide-based compound with a surface modifier so as to obtain a β-iron oxyhydroxide-based compound sol in which the powder of the β-iron oxyhydroxide-based compound containing particles whose surfaces are modified with the surface modifier is dispersed in water (hereinafter, referred to as "step (B)" as well).

According to the manufacturing method of a β-iron oxyhydroxide-based compound sol of the present disclosure, it is possible to obtain a β-iron oxyhydroxide-based compound sol capable of forming a magnetic powder (particularly, a powder of an ε-iron oxide-based compound) which makes it possible to manufacture a magnetic recording medium having excellent SNR and excellent in the film hardness of a magnetic layer.

The powder of the β-iron oxyhydroxide-based compound of the present disclosure can be obtained, for example, by drying the β-iron oxyhydroxide-based compound sol of the present disclosure.

[Step (A)]

In the step (A), an aqueous solution containing a compound having trivalent iron ions is mixed with an alkali agent, thereby obtaining a dispersion liquid of the powder of the β-iron oxyhydroxide-based compound represented by Formula (1).

The compound having trivalent iron ions is not particularly limited. For example, from the viewpoint of ease of availability and costs, a water-soluble inorganic acid salt such as a nitrate, a sulfate, or a chloride is preferable. Specifically, examples of the compound include iron (III) nitrate nonahydrate, iron (III) chloride hexahydrate, and the like.

A metallic element other than iron contained in the particles of the β-iron oxyhydroxide-based compound can be incorporated into the aqueous solution containing the compound having trivalent iron ions.

Examples of the metallic element other than iron include a metallic element represented by A in Formula (1) described above. Specifically, examples thereof include Ga, Al, In, Rh, Mn, Co, Ni, Zn, Ti, and Sn. By adding the metallic element other than iron and changing the amount of the metallic element added, the phase of the obtained iron oxide-based compound can be changed.

The source of supply of the metallic element other than iron is not particularly limited. For example, from the viewpoint of ease of availability and costs, a water-soluble inorganic acid salt such as a nitrate, a sulfate, or a chloride is preferable.

Specifically, examples thereof include gallium (III) nitrate octahydrate, gallium (III) chloride, cobalt (II) nitrate hexahydrate, titanium (IV) sulfate, titanium (IV) chloride, aluminum (III) nitrate nonahydrate, indium (III) nitrate trihydrate, rhodium (III) nitrate, cobalt (II) chloride hexahydrate, manganese (II) nitrate hexahydrate, manganese (II) chloride tetrahydrate, nickel (II) nitrate hexahydrate, nickel (II) chloride hexahydrate, zinc (II) nitrate hexahydrate, zinc (II) chloride, tin (IV) chloride pentahydrate, and the like.

As water used as a dispersion medium, pure water, deionized water, and the like are preferable.

At least one compound selected from polyvinyl pyrrolidone (PVP) and hexadecyltrimethylammonium bromide may be further incorporated into the aqueous solution containing the compound having trivalent iron ions. Provided that these compounds are further incorporated into the aqueous solution, in a case where the powder of the β-iron oxyhydroxide-based compound is used in the manufacturing method of a powder of an ε-iron oxide-based compound of the present disclosure that will be described later, the particle diameter of the particles of a precursor powder obtained by a step (D) tends to become more uniform.

It is preferable that the step (A) includes a step of mixing together the compound having trivalent iron ions, a compound containing a metallic element other than iron that is incorporated if necessary, at least one compound (hereinafter, referred to as "raw material compound" as well) selected from polyvinyl pyrrolidone (PVP) and hexadecyltrimethylammonium bromide, and water so as to prepare an aqueous solution containing the compound having trivalent iron ions.

The raw material compound and water may be simply mixed together.

The entirety of the raw material compound and the entirety of water may be mixed together at once. Alternatively, the raw material compound and water may be slowly mixed together bit by bit. Furthermore, the raw material compound and water may be mixed together by adding either of the raw material compound or water to the other bit by bit.

The method for mixing together the raw material compound and water is not particularly limited, and examples thereof include a mixing method by stirring.

The stirring means is not particularly limited. Generally, a stirring tool or a stirring device can be used.

In the step (A), the aqueous solution containing the compound having trivalent iron ions is mixed with an alkali agent, and consequently, a dispersion liquid of the powder of the β-iron oxyhydroxide-based compound represented by Formula (1) (so-called hydroxide sol) is generated.

Examples of the alkali agent include an aqueous alkali solution such as an aqueous ammonia solution, an aqueous solution of an ammonium salt compound, an aqueous sodium hydroxide (NaOH) solution, or an aqueous potassium hydroxide (KOH) solution.

The concentration of the aqueous ammonia solution and the aqueous solution of an ammonium salt compound can be set to be 20% by mass to 30% by mass for example.

The concentration of the aqueous sodium hydroxide (NaOH) solution and the aqueous potassium hydroxide (KOH) solution can be set to be 0.1% by mass to 1.0% by mass for example.

The amount of the alkali agent used is not particularly limited, and can be appropriately set, for example, within a range in which pH of the sol becomes less than 7 after the addition of the alkali agent.

The aqueous solution, which contains the compound having trivalent iron ions, and the alkali agent may be simply mixed together.

The entirety of the aqueous solution, which contains the compound having trivalent iron ions, and the entirety of the alkali agent may be mixed together at once. Alternatively, the aqueous solution, which contains the compound having trivalent iron ions, and the alkali agent may be slowly mixed together bit by bit. Furthermore, the aqueous solution, which contains the compound having trivalent iron ions, and the alkali agent may be mixed together by adding either of the aqueous solution or the alkali agent to the other bit by bit.

The aqueous solution, which contains the compound having trivalent iron ions, and the alkali agent may be mixed together in any atmosphere without particular limitation. For example, the aqueous solution and the alkali agent may be mixed together in an air atmosphere, that is, in an aerobic environment under normal pressure.

At the time of being mixed with the alkali agent, the liquid temperature of the aqueous solution, which contains the compound having trivalent iron ions, is preferably set to be 4° C. to 70° C., more preferably set to be 10° C. to 60° C., and even more preferably set to be 15° C. to 40° C.

In a case where the liquid temperature of the aqueous solution containing the compound having trivalent iron ions is 4° C. to 70° C., the powder of the β-iron oxyhydroxide-based compound tends to be more easily formed. In a case where the liquid temperature of the aqueous solution containing the compound having trivalent iron ions is equal to or lower than 70° C., the powder of the β-iron oxyhydroxide-based compound capable of forming a magnetic powder, which makes it possible to manufacture a magnetic recording medium having excellent SNR, tends to be more easily formed.

The method for mixing the aqueous solution, which contains the compound having trivalent iron ions, with the alkali agent is not particularly limited, and examples thereof include a mixing method by stirring.

The stirring means is not particularly limited. Generally, a stirring tool or a stirring device can be used.

[Step (B)]

In the step (B), the dispersion liquid of the powder of the β-iron oxyhydroxide-based compound obtained in the step (A) is mixed with a surface modifier, thereby obtaining a β-iron oxyhydroxide-based compound sol in which the powder that is a group of particles of the β-iron oxyhydroxide-based compound represented by Formula (1), a surface of the particles being modified with the surface modifier is dispersed in water.

The surface modifier has the same definition as the surface modifier described in the section of the β-iron oxyhydroxide-based compound sol, and preferred aspects thereof are also the same. Therefore, the surface modifier will not be described herein.

The amount of the surface modifier used is not particularly limited.

The amount of the surface modifier used is preferably 2 mol % to 40 mol %, more preferably 5 mol % to 30 mol %, and even more preferably 10 mol % to 25 mol %, with respect to the total amount of the compound used that is a source of supply of a metallic element.

In a case where the amount of the surface modifier used is equal to or greater than 2 mol % with respect to the total amount of the compound used that is a source of supply of a metallic element, the surface of the particles can be modified better, and consequently, the zeta potential tends to be more easily controlled. Furthermore, the dispersibility of the powder of the β-iron oxyhydroxide-based compound tends to be further improved.

In a case where the amount of the surface modifier used is equal to or smaller than 40 mol % with respect to the total amount of the compound used that is a source of supply of a metallic element, the surface modifier hardly remains unabsorbed, and consequently, the productivity tends to be further improved.

The dispersion liquid of the powder of the β-iron oxyhydroxide-based compound and the surface modifier may be simply mixed together.

The entirety of the dispersion liquid of the powder of the β-iron oxyhydroxide-based compound and the entirety of the surface modifier may be mixed together at once. Alternatively, the dispersion liquid of the powder of the β-iron oxyhydroxide-based compound and the surface modifier may be slowly mixed together bit by bit. Furthermore, the dispersion liquid of the powder of the β-iron oxyhydroxide-based compound and the surface modifier may be mixed together by adding either of the dispersion liquid or the surface modifier to the other bit by bit.

For example, from the viewpoint of more uniformly modifying the particle surface, it is preferable to mix the dispersion liquid of the powder of the β-iron oxyhydroxide-based compound with the surface modifier by adding either of the dispersion liquid or the surface modifier to the other bit by bit.

The dispersion liquid of the powder of the β-iron oxyhydroxide-based compound and the surface modifier may be mixed together in any atmosphere without particular limitation. For example, the dispersion liquid and the surface modifier may be mixed together in an air atmosphere, that is, in an aerobic environment under normal pressure.

At the time of mixing with the surface modifier, the liquid temperature of the dispersion liquid of the powder of the β-iron oxyhydroxide-based compound is not particularly limited and is preferably 5° C. to 70° C. for example.

The method for mixing together the dispersion liquid of the powder of the β-iron oxyhydroxide-based compound and the surface modifier is not particularly limited, and examples thereof include a mixing method by stirring.

The stirring means is not particularly limited. Generally, a stirring tool or a stirring device can be used.

The stirring time can be set to be 0.5 minutes to 30 minutes for example.

After the stirring, solid components are extracted.

The method for extracting the solid components is not particularly limited. For example, from the viewpoint of the simplicity of operation, a centrifugation method is preferable.

By drying the extracted solid components, the powder of the β-iron oxyhydroxide-based compound of the present disclosure can be obtained.

The extracted solid components are redispersed in water. By the redispersion, the β-iron oxyhydroxide-based compound sol of the present disclosure can be obtained.

As the water, pure water, deionized water, and the like are preferable.

The extracted solid components may be washed with water before being redispersed in water.

[Manufacturing Method of Powder of ε-Iron Oxide-Based Compound]

The manufacturing method of a powder of an ε-iron oxide-based compound of the present disclosure includes: a step of mixing (i) the aforementioned β-iron oxyhydroxide-based compound sol, in which the powder of the β-iron oxyhydroxide-based compound of the present disclosure is dispersed in water, or a β-iron oxyhydroxide-based compound sol with (ii) a silane compound having a hydrolyzable group, to obtain a dispersion liquid of a precursor powder (hereinafter, referred to as "step (C)" as well); a step of extracting a precursor powder from the dispersion liquid of a precursor powder (hereinafter, referred to as "step (D)" as well); a step of subjecting the precursor powder to a heat treatment at a temperature of equal to or higher than 800° C. and equal to or lower than 1,400° C. to obtain a heat-treated powder (hereinafter, referred to as "step (E)" as well); and a step of mixing together the heat-treated powder and an aqueous alkali solution (hereinafter, referred to as "step (F)" as well).

Hereinafter, the β-iron oxyhydroxide-based compound sol obtained by dispersing the aforementioned powder of the β-iron oxyhydroxide-based compound of the present disclosure in water, and the aforementioned β-iron oxyhydroxide-based compound sol of the present disclosure will be collectively referred to as "sol of the present disclosure" as well.

The manufacturing method of a powder of an ε-iron oxide-based compound of the present disclosure may further include other steps according to the purpose.

[Step (C)]

In the step (C), the sol of the present disclosure and a silane compound having a hydrolyzable group are mixed together, thereby obtaining a dispersion liquid of a precursor powder.

Examples of the silane compound having a hydrolyzable group include tetraethoxysilane (TEOS: Tetraethyl Orthosilicate), tetramethoxysilane, and the like.

Among these, as the silane compound having a hydrolyzable group, TEOS is preferable.

The amount of the silane compound having a hydrolyzable group used is preferably set such that the amount of Si becomes 0.5 mol to 30 mol with respect to 1 mol of Fe, and more preferably set such that the amount of Si becomes 2 mol to 15 mol with respect to 1 mol of Fe.

The sol of the present disclosure and the silane compound having a hydrolyzable group may be simply mixed together.

The entirety of the sol of the present disclosure and the entirety of the silane compound having a hydrolyzable group may be mixed together at once. Alternatively, the sol of the present disclosure and the silane compound having a hydrolyzable group may be slowly mixed together bit by bit. Furthermore, the sol of the present disclosure and the silane compound having a hydrolyzable group may be mixed together by adding either of the sol or the silane compound to the other bit by bit.

For example, from the viewpoint of more uniformly reacting the particles of the β-iron oxyhydroxide-based compound with the silane compound, it is preferable to mix the sol of the present disclosure with the silane compound having a hydrolyzable group by adding the silane compound having a hydrolyzable group bit by bit to the sol of the present disclosure.

The method for mixing together the sol of the present disclosure and the silane compound having a hydrolyzable group is not particularly limited, and examples thereof include a mixing method by stirring.

The stirring means is not particularly limited. Generally, a stirring tool or a stirring device can be used.

The stirring time is not particularly limited, and can be set to be 1 hour to 24 hours for example.

The liquid temperature at the time of stirring can be set to be 15° C. to 80° C. The mixture may be heated to 30° C. to 80° C.

After the sol of the present disclosure and the silane compound having a hydrolyzable group are mixed together, an aggregating agent may be added thereto.

As the aggregating agent, a salt having a valency equal to or higher than 2 is preferable.

It is preferable that the aggregating agent exhibits high solubility in water. Herein, "high solubility in water" means that in a case where the aggregating agent is added to water with a temperature of 25° C., the amount of the aggregating agent dissolved in water is equal to or greater than 5% by mass.

Examples of the aggregating agent include ammonium sulfate, ammonium oxalate, and the like.

The liquid temperature at the time of adding the aggregating agent can be set to be 15° C. to 80° C. for example.

It is preferable that the aggregating agent is added while the aqueous solution is being stirred.

[Step (D)]

In the step (D), from the dispersion liquid of a precursor powder obtained in the step (C), a precursor powder is extracted.

The method for extracting the precursor powder is not particularly limited. For example, from the viewpoint of the simplicity of operation, a centrifugation method is preferable.

The centrifugation condition is not particularly limited. For example, the centrifugation can be performed for 1 minute to 60 minutes at 1,000 rpm (revolutions per minute; the shall be applied hereinafter) to 10,000 rpm.

The extracted precursor powder may be dried.

The drying method is not particularly limited, and examples thereof include a method of using a drying machine (for example, an oven).

The precursor powder is a group of particles on which a Si-containing coat generated by the hydrolysis of the silane compound is formed. Presumably, the Si-containing coat may be a coat of an oxide or hydroxide of Si.

[Step (E)]

In the step (E), a heat treatment (so-called firing) is performed on the precursor powder obtained in the step (D) at a temperature within a range of 800° C. to 1,400° C., thereby obtaining a heat-treated powder. By performing the heat treatment, the precursor powder obtains magnetism.

The heat treatment can be performed in any atmosphere without particular limitation. For example, the heat treatment may be performed in an air atmosphere, that is, in an aerobic environment under normal pressure.

The heat treatment temperature (so-called firing temperature) is preferably within a range of 850° C. to 1,200° C., and more preferably within a range of 900° C. to 1,150° C.

The heat treatment time is not particularly limited, and can be set to be 0.5 hours to 20 hours for example.

[Step (F)]

In the step (F), the heat-treated powder obtained in the step (E) and an aqueous alkali solution are mixed together. By mixing together the heat-treated powder and the aqueous alkali solution such that the heat-treated powder is treated with an alkali, the Si-containing coat remaining on the particles of the precursor powder is removed.

It is considered that the Si-containing coat may almost uniformly remain as a thin film on the surface of the particles of the heat-treated powder without being totally removed.

The aqueous alkali solution is not particularly limited. For example, an aqueous solution of a strong alkali such as an aqueous sodium hydroxide (NaOH) solution or an aqueous potassium hydroxide (KOH) solution is preferable.

As water which is a solvent of the aqueous alkali solution, pure water, deionized water, and the like are preferable.

The liquid temperature of the aqueous alkali solution at the time of mixing with the heat-treated powder is not particularly limited, and can be set to be equal to or higher than 70° C. for example. Because water is used as a solvent, the liquid temperature of the aqueous alkali solution is preferably less than 100° C.

The concentration of the aqueous alkali solution is not particularly limited, and can be set to be equal to or higher than 4 mol/L for example.

The amount of the aqueous alkali solution used is not particularly limited. For example, the amount of the aqueous alkali solution used is preferably 400% to 20,000% of the mass of the heat-treated powder, and more preferably 1,000% to 10,000% of the mass of the heat-treated powder.

The heat-treated powder and the aqueous alkali solution may be simply mixed together.

The entirety of the heat-treated powder and the entirety of the aqueous alkali solution may be mixed together at once. Alternatively, the heat-treated powder and the aqueous alkali solution may be slowly mixed together bit by bit. Furthermore, the heat-treated powder and the aqueous alkali solution may be mixed together by adding either of the heat-treated powder or the aqueous alkali solution to the other bit by bit.

For example, from the viewpoint of the uniformity of the reaction, it is preferable to mix the heat-treated powder with the aqueous alkali solution by adding the heat-treated powder bit by bit to the aqueous alkali solution.

The method for mixing together the heat-treated powder and the aqueous alkali solution is not particularly limited, and examples thereof include a mixing method by stirring.

The stirring means is not particularly limited. Generally, a stirring tool or a stirring device can be used.

The stirring time is not particularly limited, and can be set to be 3 hours to 36 hours for example.

After the alkali treatment, from the aqueous alkali solution, a group of particles from which the Si-containing coat has been removed (that is, the powder of the ε-iron oxide-based compound) is extracted.

The method for extracting the powder of the ε-iron oxide-based compound is not particularly limited. For example, from the viewpoint of the simplicity of operation, a centrifugation method is preferable.

[Step (G)]

In the step (G), the powder of the ε-iron oxide-based compound obtained in the step (F) is washed and dried.

For washing, water or an aqueous solution containing a water-soluble polymer may be used.

In a case where the aqueous solution containing a water-soluble polymer is used, the dispersibility of the powder of the ε-iron oxide-based compound in the aqueous solution tends to be improved. Furthermore, in a case where the surface of the particles of the ε-iron oxide-based compound is treated with the water-soluble polymer, due to the solid-liquid separation following the treatment, undesirable fine particles tend to be more efficiently removed.

As the water used for washing and the water which is a solvent of the aqueous solution containing a water-soluble polymer, pure water, deionized water, and the like are preferable.

Examples of the water-soluble polymer include polyvinyl alcohol (PVA), hydroxymethyl cellulose (HMC), polyvinyl pyrrolidone (PVP), and the like.

The solid-liquid separation method is not particularly limited. For example, from the viewpoint of the simplicity of operation, a centrifugation method is preferable.

The centrifugation condition is not particularly limited. For example, the centrifugation can be performed for 1 minute to 60 minutes at 1,000 rpm to 10,000 rpm.

The method for drying the washed powder of the ε-iron oxide-based compound is not particularly limited, and examples thereof include a method of using a drying machine (for example, an oven) with an internal atmospheric temperature of 60° C. to 110° C.

[Powder of ε-Iron Oxide-Based Compound]

The powder of the ε-iron oxide-based compound obtained by the manufacturing method of a powder of an ε-iron oxide-based compound of the present disclosure is manufactured using the sol of the present disclosure. Accordingly, the powder makes it possible to manufacture a magnetic recording medium having excellent SNR and excellent in the film hardness of a magnetic layer.

In a case where a sol, which is obtained by dispersing the powder of the compound represented by Formula (1) described above in water, is used as the β-iron oxyhydroxide-based compound sol in the manufacturing method of a powder of an ε-iron oxide-based compound of the present disclosure, a powder of an ε-iron oxide-based compound represented by Formula (1-1) below is obtained.

$$\varepsilon\text{-}A^1_{a1}Fe_{2-a1}O_3 \qquad (1\text{-}1)$$

In Formula (1-1), $A^1$ represents at least one metallic element other than Fe, and a1 represents a number that satisfies a relationship of $0 \leq a1 < 2$.

$A^1$ in the Formula (1-1) corresponds to A in Formula (1) described above. a1 in Formula (1-1) equals a value that is approximately 2 times greater than a in Formula (1) described above.

Hereinafter, a powder of an ε-iron oxide-based compound will be described which is obtained in a case where a sol obtained by dispersing the powder of the compound represented by any of Formulae (2) to (6) described above in water is used as the β-iron oxyhydroxide-based compound sol.

In a case where a sol, which is obtained by dispersing the powder of the compound represented by Formula (2) described above in water, is used as the β-iron oxyhydroxide-based compound sol in the manufacturing method of a powder of an ε-iron oxide-based compound of the present disclosure, a powder of an ε-iron oxide-based compound represented by Formula (2-1) below is obtained.

$$\varepsilon\text{-}Z^1_{z1}Fe_{2-z1}O_3 \qquad (2\text{-}1)$$

In Formula (2-1), $Z^1$ represents at least one trivalent metallic element selected from the group consisting of Ga, Al, In, and Rh. z1 represents a number that satisfies a relationship of $0 < z1 < 2$.

$Z^1$ in Formula (2-1) corresponds to Z in Formula (2) described above. Furthermore, z1 in Formula (2-1) equals a value which is approximately two times greater than z in Formula (2) described above.

In a case where a sol, which is obtained by dispersing the powder of the compound represented by Formula (3) described above in water, is used as the β-iron oxyhydroxide-based compound sol in the manufacturing method of a powder of an ε-iron oxide-based compound of the present disclosure, a powder of an ε-iron oxide-based compound represented by Formula (3-1) below is obtained.

$$\varepsilon\text{-}X^1_{x1}Y^1_{y1}Fe_{2-x1-y1}O_3 \qquad (3\text{-}1)$$

In Formula (3-1), $X^1$ represents at least one divalent metallic element selected from the group consisting of Co, Ni, Mn, and Zn, and $Y^1$ represents at least one quadrivalent metallic element selected from Ti and Sn. x1 represents a number that satisfies a relationship of $0 < x1 < 1$, and y1 represents a number that satisfies a relationship of $0 < y1 < 1$.

Each of $X^1$ and $Y^1$ in Formula (3-1) corresponds to each of X and Y in Formula (3) described above. Furthermore, each of x1 and y1 in Formula (3-1) equals a value which is approximately 2 times greater than each of x and y in Formula (3) described above.

In a case where a sol, which is obtained by dispersing the compound represented by Formula (4) described above in water, is uses as the β-iron oxyhydroxide-based compound sol in the manufacturing method of a powder of an ε-iron oxide-based compound of the present disclosure, a powder of an ε-iron oxide-based compound represented by Formula (4-1) below is obtained.

$$\varepsilon\text{-}X^1_{x1}Z^1_{z1}Fe_{2-x1-z1}O_3 \qquad (4\text{-}1)$$

In Formula (4-1), $X^1$ represents at least one divalent metallic element selected from the group consisting of Co, Ni, Mn, and Zn, and $Z^1$ represents at least one trivalent metallic element selected from the group consisting of Ga, Al, In, and Rh. x1 represents a number that satisfies a relationship of $0 < x1 < 1$, and z1 represents a number that satisfies a relationship of $0 < z1 < 1$.

Each of $X^1$ and $Z^1$ in Formula (4-1) corresponds to each of X and Z in Formula (4) described above. Furthermore, each of x1 and z1 in Formula (4-1) equals a value which is approximately 2 times greater than each of x and z in Formula (4) described above.

In a case where a sol, which is obtained by dispersing the powder of the compound represented by Formula (5) described above in water, is used as the β-iron oxyhydroxide-based compound sol in the manufacturing method of a powder of an ε-iron oxide-based compound of the present disclosure, a powder of an ε-iron oxide-based compound represented by Formula (5-1) below is obtained.

$$\varepsilon\text{-}Y^1_{y1}Z^1_{z1}Fe_{2-y1-z1}O_3 \qquad (5\text{-}1)$$

In Formula (5-1), $Y^1$ represents at least one quadrivalent metallic element selected from Ti and Sn, and $Z^1$ represents at least one trivalent metallic element selected from the group consisting of Ga, Al, In, and Rh. y1 represents a number that satisfies a relationship of $0 < y1 < 1$, and z1 represents a number that satisfies a relationship of $0 < z1 < 1$.

Each of $Y^1$ and $Z^1$ in Formula (5-1) corresponds to each of Y and Z in Formula (5) described above. Furthermore, each of y1 and z1 in Formula (5-1) equals a value which is approximately 2 times greater than each of y and z in Formula (5) described above.

In a case where a sol, which is obtained by dispersing the powder of the compound represented by Formula (6) described above in water, is used as the β-iron oxyhydroxide-based compound sol in the manufacturing method of a powder of an ε-iron oxide-based compound of the present disclosure, a powder of an ε-iron oxide-based compound represented by Formula (6-1) below is obtained.

$$\varepsilon\text{-}X^1_{x1}Y^1_{y1}Z^1_{z1}Fe_{2-x1-y1-z1}O_3 \qquad (6\text{-}1)$$

In Formula (6-1), $X^1$ represents at least one divalent metallic element selected from the group consisting of Co, Ni, Mn, and Zn, $Y^1$ represents at least one quadrivalent metallic element selected from Ti and Sn, and $Z^1$ represents at least one trivalent metallic element selected from the group consisting of Ga, Al, In, and Rh. x1 represents a number that satisfies a relationship of $0 < x1 < 1$, y1 represents a number that satisfies a relationship of $0 < y1 < 1$, z1 represents a number that satisfies a relationship of $0 < z1 < 1$, and $x1 + y1 + z1 < 2$.

Each of $X^1$, $Y^1$, and $Z^1$ in Formula (6-1) corresponds to each of X, Y, and Z in Formula (6) described above. Furthermore, each of x1, y1, and z1 in Formula (6-1) equals a value which is approximately 2 times greater than each of x, y, and z in Formula (6) described above.

Whether the powder of the ε-iron oxide-based compound obtained by the manufacturing method of a powder of an ε-iron oxide-based compound of the present disclosure is an iron oxide-based compound having an ε-type crystal structure can be checked, for example, by X-ray diffraction (XRD) method.

The composition of the ε-iron oxide-based compound is checked by a high-frequency Inductively Coupled Plasma (ICP) emission spectrometry.

The specific method for checking the composition is the same as the method for checking the composition of the β-iron oxyhydroxide-based compound described above.

Therefore, the method will not be described herein.

As a measurement apparatus, for example, ICPS-8100 (trade name) from Shimadzu Corporation can be suitably used, but the measurement apparatus is not limited to this.

The shape of the particles of the ε-iron oxide-based compound is not particularly limited.

For example, the particles of the ε-iron oxide-based compound have a spherical shape, a rod shape, a needle shape, and the like.

Among these, as the shape of the particles of the ε-iron oxide-based compound, a spherical shape is preferable. From the viewpoint of dispersion and alignment, the spherical shape is preferable because the specific surface area thereof can be reduced further compared to other shapes.

The average equivalent circular diameter of the powder of the ε-iron oxide-based compound is preferably 7 nm to 35 nm, more preferably 8 nm to 25 nm, and even more preferably 10 nm to 18 nm, for example.

In a case where the average equivalent circular diameter of the powder of the ε-iron oxide-based compound is equal to or greater than 7 nm, handleability is further improved. In addition, the crystal structure of the ε-iron oxide is more stabilized, and the distribution of magnetic characteristics is narrowed.

In a case where the average equivalent circular diameter of the powder of the ε-iron oxide-based compound is equal to or smaller than 35 nm, recording density can be further increased. In addition, it is easy to adjust the powder to have magnetic characteristics suited for recording and reproduction, and accordingly, a magnetic recording medium with better SNR can be realized.

In the present disclosure, "average equivalent circular diameter of the powder of the ε-iron oxide-based compound" means a number average of equivalent circular diameters of 500 primary particles of the ε-iron oxide-based compound.

The equivalent circular diameter of the particles of the ε-iron oxide-based compound is determined based on an image obtained using a transmission electron microscope (TEM). Specifically, the diameter of a circle having the same area as the area of a particle of the ε-iron oxide-based compound in the TEM image is adopted as the equivalent circular diameter.

Specific examples of the method for measuring the average equivalent circular diameter of the powder of the ε-iron oxide-based compound will be described in Examples which will be described later.

The average equivalent circular diameter of the powder of the ε-iron oxide-based compound can be controlled by the firing temperature at the time of preparing the powder of the ε-iron oxide-based compound, the type of the metallic element to be substituted, and the like.

For example, the equivalent circular diameter of the particles of the ε-iron oxide-based compound can be increased by raising the firing temperature at the time of preparing the powder of the ε-iron oxide-based compound, and can be reduced by lowering the firing temperature.

[Manufacturing Method of Magnetic Recording Medium]

The manufacturing method of a magnetic recording medium of the present disclosure includes: a step of preparing a composition for forming a magnetic layer by using the powder of the ε-iron oxide-based compound obtained by the manufacturing method of a powder of an ε-iron oxide-based compound of the present disclosure described above (hereinafter, referred to as "step I" as well); a step of applying the composition for forming a magnetic layer onto a non-magnetic support to form a layer of the composition for forming a magnetic layer (hereinafter, referred to as "step II" as well); a step of subjecting the layer of the composition for forming a magnetic layer to a magnetic field alignment treatment (hereinafter, referred to as "step III" as well); and a step of drying the layer of the composition for forming a magnetic layer that has been subjected to the magnetic field alignment treatment, to form a magnetic layer (hereinafter, referred to as "step IV" as well).

According to the manufacturing method of a magnetic recording medium of the present disclosure, it is possible to manufacture a magnetic recording medium having excellent SNR and excellent in the film hardness of a magnetic layer.

If necessary, the manufacturing method of a magnetic recording medium of the present disclosure can further include a step of subjecting the non-magnetic support having the magnetic layer to a calendar treatment (hereinafter, referred to as "step V" as well), a step of forming an optional layer such as a non-magnetic layer or a backcoat layer (hereinafter, referred to as "step VI" as well), and the like. Each of these steps may be divided into two or more stages.

Hereinafter, each of the steps will be specifically described.

[Step I]

In the step I, a composition for forming a magnetic layer is prepared using the powder of the ε-iron oxide-based compound obtained by the manufacturing method of a powder of an ε-iron oxide-based compound of the present disclosure.

Details of how to obtain the powder of the ε-iron oxide-based compound by the manufacturing method of a powder of an ε-iron oxide-based compound of the present disclosure are as described above. Therefore, the details will not be described herein.

The step I can include a step of mixing together the powder of the ε-iron oxide-based compound, a binder, and, if necessary, at least one component selected from the group consisting of an abrasive, various additives (for example, other additives which will be described later), and a solvent so as to obtain a mixed solution (hereinafter, referred to as "step I-1" as well) and a step of dispersing the mixed solution obtained in the step I-1 (hereinafter, referred to as "step I-2" as well).

All the raw materials such as the powder of the ε-iron oxide-based compound, the binder, and the abrasive may be mixed together at any point in time during the step I.

In the step I, the raw materials may be mixed together at once or mixed together by being divided into two or more portions.

For example, the binder may be mixed with other raw materials in the step I-2 and then further added to and mixed with the raw materials so as to adjust viscosity after dispersion.

For dispersing the raw materials of the composition for forming a magnetic layer, it is possible to use known dispersion apparatuses such as a batch-type vertical sand mill and a horizontal beads mill.

As dispersion beads, it is possible to use glass beads, zirconia beads, titania beads, steel beads, and the like. The particle diameter (so-called bead size) and the filling rate of the dispersion beads to be used can be appropriately optimized.

For dispersing the raw materials of the composition for forming a magnetic layer, for example, known ultrasonic apparatuses can be used.

Furthermore, before the step I-2, at least a portion of the raw materials of the composition for forming a magnetic layer may be kneaded using, for example, an open kneader.

The raw materials of the composition for forming a magnetic layer may be mixed together after each of the raw materials is prepared in the form of a solution. For example, it is possible to prepare a magnetic solution containing the powder of the ε-iron oxide-based compound and an abrasive solution containing the abrasive, then to mix the solutions together, and to disperse the raw materials.

(Composition for Forming Magnetic Layer)

"Powder of the ε-iron oxide-based compound" for preparing the composition for forming a magnetic layer has the same definition as the powder described in the section of "powder of the ε-iron oxide-based compound", and preferred aspects thereof are also the same. Therefore, the powder will not be described herein.

The content rate of the powder of the ε-iron oxide-based compound in the composition for forming a magnetic layer is preferably equal to or higher than 5% by mass and equal to or lower than 30% by mass, and more preferably equal to or higher than 8% by mass and equal to or lower than 20% by mass, with respect to the total mass of the composition for forming a magnetic layer.

(Binder)

It is preferable that the composition for forming a magnetic layer contains a binder.

Examples of the binder include various resins.

The resin used as the binder is not particularly limited as long as the resin can form a layer satisfying intended physical characteristics such as hardness and durability.

The resin used as the binder may be a homopolymer or a copolymer. Furthermore, the resin may be a known electron beam-curable type resin.

Examples of the resin used as the binder include polyurethane, a polyester-based resin, a polyamide-based resin, a vinyl chloride-based resin, styrene, acrylonitrile, an acrylic resin obtained by copolymerizing methyl methacrylate and the like, a cellulose resin such as nitrocellulose, an epoxy resin, a phenoxy resin, a polyvinyl alkyral resin such as polyvinyl acetal or polyvinyl butyral, and the like.

Among these, as the resin used as the binder, at least one resin selected from the group consisting of polyurethane, an acrylic resin, a cellulose-based resin, and a vinyl chloride-based resin is preferable.

For example, from the viewpoint of further improving the dispersibility of the powder of the ε-iron oxide-based compound, it is preferable that the resin used as the binder has a functional group (for example, a polar group), which is adsorbed onto the surface of the particles of the ε-iron oxide-based compound, within a molecule.

As the functional group, for example, $-SO_3M$, $-SO_4M$, $-PO(OM)_2$, $-OPO(OM)_2$, $-COOM$, $=NSO_3M$, $-NRSO_3M$, $-NR^1R^2$, $-N^+R^2R^3X^-$, and the like are preferable.

M represents a hydrogen atom or an alkali metal atom such as Na or K. R represents an alkylene group. $R^1$, $R^2$, and $R^3$ each independently represent a hydrogen atom, an alkyl group, or a hydroxyalkyl group. X represents a halogen atom such as Cl or Br.

In a case where the resin used as the binder has the aforementioned functional group, the content of the functional group in the resin is preferably 0.01 meq/g to 2.0 meq/g, and more preferably 0.3 meq/g to 1.2 meq/g.

In a case where the content of the functional group in the resin is within the above range, the dispersibility of the powder of the ε-iron oxide-based compound in the magnetic layer is further improved, and magnetic density can be further improved.

As the resin used as the binder, polyurethane having $-SO_3Na$ (hereinafter, referred to as "$SO_3Na$ group" as well) is more preferable. In a case where polyurethane having a $SO_3Na$ group is used as the binder, the amount of the $SO_3Na$ group contained in the polyurethane is preferably within a range of 0.01 meq/g to 1.0 meq/g.

The molecular weight of the resin used as the binder that is expressed as a weight-average molecular weight can be set to be 10,000 to 200,000 for example.

In the present disclosure, the weight-average molecular weight is a value determined by expressing a value measured by gel permeation chromatography (GPC) in terms of polystyrene. The measurement conditions are as below, for example.

—Conditions—

GPC apparatus: HLC-8120 (Tosoh Corporation)
Column: TSK gel Multipore HXL-M (Tosoh Corporation, 7.8 mmID (Inner Diameter)×30.0 cm)
Eluent: tetrahydrofuran (THF)
Sample concentration: 0.5% by mass
Amount of sample injected: 10 μL
Flow rate: 0.6 mL/min
Measurement temperature: 40° C.
Detector: RI detector In a case where the composition for forming a magnetic layer contains the binder, the composition contains only one kind of binder or two or more kinds of binders.

In a case where the composition for forming a magnetic layer contains the binder, the content of the binder in the composition for forming a magnetic layer is not particularly limited. For example, the content of the binder with respect to 100 parts by mass of the powder of the ε-iron oxide-based compound is preferably equal to or greater than 5 parts by mass and equal to or smaller than 50 parts by mass, and more preferably equal to or greater than 10 parts by mass and equal to or smaller than 30 parts by mass.

In a case where the content of the binder in the composition for forming a magnetic layer is within the above range with respect to 100 parts by mass of the powder of the ε-iron oxide-based compound, the dispersibility of the powder of the ε-iron oxide-based compound in the magnetic layer is further improved, and magnetic density can be further improved.

(Abrasive)

The composition for forming a magnetic layer can contain an abrasive.

The abrasive can contribute to the reduction of tape damage such as abrasion or scratching that can occur while a magnetic recording medium is running, and the removal of attachments (so-called debris) that adhere to a head while a magnetic recording medium is being used.

Examples of the abrasive mainly include particles of known materials with Mohs hardness equal to or higher than 6, such as α-alumina, β-alumina, silicon carbide, chromium oxide, cerium oxide, α-iron oxide, corundum, artificial diamond, silicon nitride, silicon carbide, titanium carbide, titanium oxide, silicon dioxide, and boron nitride.

As the abrasive, a complex of the abrasives described above (for example, an abrasive whose surface is treated with another abrasive) may be used. Although this type of abrasive contains a compound or element other than main components in some cases, as long as the proportion of the main components is equal to or higher than 90% by mass, the effect of the abrasive does not change.

The shape of the abrasive is not particularly limited. For example, the abrasive has the shape of a needle-like particle, a spherical particle, a cubical particle, a rectangular particle, and the like.

For example, from the viewpoint of further improving abrasive properties, among these, abrasives with the shape of a particle partially having a corner, such as a needle-like particle and a cubical particle, are preferable.

The average equivalent circular diameter of a powder of the abrasive is not particularly limited. For example, from the viewpoint of more appropriately maintaining the abrasive properties of the abrasive, the average equivalent circular diameter is preferably 0.01 µm to 2.0 µm, more preferably 0.05 µm to 1.0 µm, and even more preferably 0.05 µm to 0.5 µm.

In a case where a plurality of kinds of abrasives having different particle diameters are used in combination, the durability of the magnetic layer can be improved. Furthermore, in a case where the particle size distribution of the powder of the abrasive is narrowed, the electromagnetic conversion characteristics of a magnetic recording medium can be improved.

In the present disclosure, the average equivalent circular diameter of the powder of the abrasive is measured by the same method as that used for measuring the average equivalent circular diameter of the powder of the β-iron oxyhydroxide-based compound described above.

The BET specific surface area of the abrasive is preferably 1 m²/g to 30 m²/g.

The tap density of the abrasive is preferably 0.3 g/mL to 2 g/mL.

In a case where the composition for forming a magnetic layer contains the abrasive, the composition may contain only one kind of abrasive or two or more kinds of abrasives.

As the abrasive, commercial products can be used.

Examples of the commercial products include AKP-12, AKP-15, AKP-20, AKP-30, AKP-50, HIT20, HIT-30, HIT-55, HIT60A, HIT70, HIT80, and HIT100 from Sumitomo Chemical Co., Ltd., ERC-DBM, HP-DBM, and HPS-DBM from Reynolds Metals Company, WA10000 from Fujimi Incorporated, UB20 from Uemura & CO., LTD., G-5, KROMEX U2, and KROMEX U1 from Nippon Chemical Industrial CO., LTD., TF100 and TF140 manufactured by TODAKOGYO CORP, BETA RANDOM ULTRAFINE from IBIDEN, B-3 from SHOWA KDE CO., LTD., and the like (all of the above are trade names).

In a case where the composition for forming a magnetic layer contains the abrasive, the content of the abrasive in the composition for forming a magnetic layer is not particularly limited. For example, the content of the abrasive with respect to 100 parts by mass of the powder of the ε-iron oxide-based compound is preferably 0.1 parts by mass to 20 parts by mass, and more preferably 0.5 parts by mass to 15 parts by mass.

In a case where the content of the abrasive in the composition for forming a magnetic layer is equal to or greater than 0.1 parts by mass with respect to 100 parts by mass of the powder of the ε-iron oxide-based compound, the abrasion resistance of the formed magnetic layer can be further improved.

In a case where the content of the abrasive in the composition for forming a magnetic layer is equal to or smaller than 20 parts by mass with respect to 100 parts by mass of the powder of the ε-iron oxide-based compound, the influence thereof exerted on the content of the powder of the ε-iron oxide-based compound is small. Accordingly, a magnetic recording medium with better SNR can be realized.

(Other Additives)

If necessary, the composition for forming a magnetic layer may contain various additives (so-called other additives) in addition to the powder of the ε-iron oxide-based compound, the binder, and the abrasive, within a range that does not deteriorate the effects.

Examples of those other additives include a non-magnetic filler, a lubricant, a dispersant, a curing agent, a dispersion aid, a fungicide, an antistatic agent, an antioxidant, and the like.

Each of those other additives may perform two or more functions.

—Non-Magnetic Filler—

The magnetic layer can contain a non-magnetic filler.

The non-magnetic filler can contribute to the adjustment of physical properties of the magnetic layer such as film hardness and surface roughness.

In the present disclosure, "non-magnetic filler" means a filler satisfying at least one of the remanent flux density equal to or lower than 10 mT or coercivity equal to or lower than 7.98 kA/m (100 Oe).

Examples of the non-magnetic filler include carbon black, inorganic particles, and the like.

For example, from the viewpoint of the dispersion stability and the uniform alignment in the magnetic layer, as the non-magnetic filler, colloidal particles are preferable.

Furthermore, for example, from the viewpoint of ease of availability, as the non-magnetic filler, at least one filler selected from the group consisting of carbon black and inorganic colloidal particles is preferable, and at least one filler selected from the group consisting of carbon black and inorganic oxide colloidal particles is more preferable.

Examples of the inorganic oxide colloidal particles include colloidal particles of inorganic oxides such as α-alumina with an a transformation rate equal to or higher than 90%, β-alumina, γ-alumina, θ-alumina, silicon dioxide, silicon carbide, chromium oxide, cerium oxide, α-iron oxide, goethite, corundum, silicon nitride, titanium carbide, titanium dioxide, tin oxide, magnesium oxide, tungsten oxide, zirconium oxide, boron nitride, zinc oxide, calcium carbonate, calcium sulfate, barium sulfate, and molybdenum disulfide and colloidal particles of composite inorganic oxides such as $SiO_2/Al_2O_3$, $SiO_2/B_2O_3$, $TiO_2/CeO_2$, $SnO_2/Sb_2O_3$, $SiO_2/Al_2O_3/TiO_2$, and $TiO_2/CeO_2/SiO_2$.

From the viewpoint of ease of availability of monodispersed colloidal particles, as the inorganic oxide colloidal particles, silica colloidal particles (so-called colloidal silica) are particularly preferable.

The average particle diameter of the non-magnetic filler is not particularly limited. For example, from the viewpoint of reducing recording errors and securing spacing of a magnetic head, the average particle diameter of the non-magnetic filler is preferably 30 nm to 300 nm, more preferably 40 nm to 250 nm, and even more preferably 50 nm to 200 nm.

In the present disclosure, the average particle diameter of the non-magnetic filler is a value measured using a transmission electron microscope (TEM).

In a case where the composition for forming a magnetic layer contains the non-magnetic filler, the composition may contain only one kind of non-magnetic filler or two or more kinds of non-magnetic fillers.

As the non-magnetic filler, commercial products can be used.

In a case where the composition for forming a magnetic layer contains the non-magnetic filler, the content of the non-magnetic filler in the composition for forming a magnetic layer is not particularly limited. For example, the content of the non-magnetic filler with respect to 100 parts by mass of the powder of the ε-iron oxide-based compound is preferably 0.01 parts by mass to 10 parts by mass.

—Lubricant—

The composition for forming a magnetic layer can contain a lubricant.

The lubricant can contribute, for example, to the improvement of running durability of a magnetic recording medium.

As the lubricant, known hydrocarbon-based lubricant, fluorine-based lubricant, and the like can be used. Examples of the hydrocarbon-based lubricant include a carboxylic acid-based compound such as oleic acid or stearic acid, an ester-based compound such as butyl stearate, a sulfonic acid-based compound such as octadecyl sulfonate, a phosphoric acid ester-based compound such as monooctadecyl phosphate, an alcohol-based compound such as stearyl alcohol or oleyl alcohol, a carboxylic acid amide-based compound such as stearic acid amide, an amine-based compound such as stearyl amine, and the like.

For example, from the viewpoint of improving the effect of reducing friction force, as the hydrocarbon-based lubricant, a compound is preferable which has a polar group such as a hydroxyl group, an ester group, or a carboxy group in a hydrocarbon chain of an alkyl group.

Examples of the fluorine-based lubricant include a compound obtained in a case where the alkyl group of the aforementioned hydrocarbon-based lubricant is partially or totally substituted with a fluoroalkyl group or a perfluoropolyether group.

In a case where the composition for forming a magnetic layer contains the lubricant, the composition may contain only one kind of lubricant or two or more kinds of lubricants.

As the lubricant, commercial products can be used.

In a case where the composition for forming a magnetic layer contains the lubricant, the content of the lubricant in the composition for forming a magnetic layer is not particularly limited. For example, the content of the lubricant with respect to 100 parts by mass of the powder of the ε-iron oxide-based compound is preferably 0.1 parts by mass to 20 parts by mass, and more preferably 0.5 parts by mass to 15 parts by mass.

—Dispersant—

The composition for forming a magnetic layer can contain a dispersant.

The dispersant can contribute to the improvement of the dispersibility of the powder of the ε-iron oxide-based compound and the prevention of the aggregation of the powder. Furthermore, the dispersant can contribute to the improvement of the dispersibility of the abrasive.

As the dispersant, an organic compound is preferable which has a functional group adsorbed onto the surface of the particles of the ε-iron oxide-based compound.

Examples of the organic compound having a functional group adsorbed onto the surface of the particles of the ε-iron oxide-based compound include a compound having 1 to 3 amino groups, 1 to 3 carboxy groups, 1 to 3 sulfonic acid groups, or 1 to 3 sulfinic acid groups.

The dispersant may be a polymer of these.

As the dispersant, for example, compounds are preferable which are represented by structural formulae such as R—$NH_2$, $NH_2$—R—$NH_2$, $NH_2$—R($NH_2$)—$NH_2$, R—COOH, COOH—R—COOH, COOH—R(COOH)—COOH, R—$SO_3H$, $SO_3H$—R—$SO_3H$, $SO_3H$—R($SO_3H$)—$SO_3H$, R—$SO_2H$, $SO_2H$—R—$SO_2H$, and $SO_2H$—R($SO_2H$)—$SO_2H$.

R in the structural formulae represents a linear, branched, or cyclic saturated or unsaturated hydrocarbon group. For example, R is preferably an alkyl group having 1 to 20 carbon atoms.

Specifically, as the dispersant, for example, oleic acid, stearic acid, 2,3-dihydroxynaphthalene, and the like are preferable.

Among these, as the dispersant, from the viewpoint of dispersibility, at least one compound selected from oleic acid and 2,3-dihydroxynaphthalene is more preferable.

In a case where the composition for forming a magnetic layer contains the dispersant, the composition may contain only one kind of dispersant or two or more kinds of dispersants.

As the dispersant, commercial products can be used.

In a case where the composition for forming a magnetic layer contains the dispersant, the content of the dispersant in the composition for forming a magnetic layer is preferably 0.1 parts by mass to 30 parts by mass with respect to 100 parts by mass of the powder of the ε-iron oxide-based compound (with respect to the total amount of the powder of the ε-iron oxide-based compound and an abrasive in a case where the composition contains the abrasive).

In a case where the content of the dispersant in the composition for forming a magnetic layer is within the above range with respect to 100 parts by mass of the powder of the ε-iron oxide-based compound (with respect to the total amount of the powder of the ε-iron oxide-based compound and an abrasive in a case where the composition contains the abrasive), for example, the dispersibility of the powder of the ε-iron oxide-based compound (the powder of the ε-iron oxide-based compound and an abrasive in a case where the composition contains the abrasive) is further improved, and the abrasion resistance of the formed magnetic layer can be further improved.

—Curing Agent—

The composition for forming a magnetic layer can contain a curing agent.

The curing agent can contribute to the improvement of film hardness. In a case where the curing agent is used, a crosslinking structure is formed between the curing agent and the aforementioned binder forming a magnetic layer, and consequently, the film hardness of the magnetic layer can be improved.

As the curing agent, an isocyanate-based compound is preferable.

Examples of the isocyanate-based compound include tolylene diisocyanate, 4,4'-diphenylmethane diisocyanate, hexamethylene diisocyanate, xylylene diisocyanate, naphthalene-1,5-diisocyanate, o-toluidine diisocyanate, isophorone diisocyanate, triphenylmethane triisocyanate, and the like.

As the isocyanate-based compound, it is also possible to use polyisocyanate such as a product of a reaction between the aforementioned isocyanate-based compound and polyalcohol and a condensation product of the aforementioned isocyanate-based compound.

As the curing agent, commercial products can be used.

Examples of the commercial products of the isocyanate-based compound as the curing agent include CORONATE (registered trademark) L, CORONATE (registered trademark) HL, CORONATE (registered trademark) 2030, CORONATE (registered trademark) 2031, CORONATE (registered trademark) 3041, MILLIONATE (registered trademark) MR, and MILLIONATE (registered trademark) MTL from Tosoh Corporation, TAKENATE (registered trademark) D-102, TAKENATE (registered trademark) D-110N, TAKENATE (registered trademark) D-200, and TAKENATE (registered trademark) D-202 from Mitsui Chemicals, Inc., DESMODUR (registered trademark) L, DESMODUR (registered trademark) IL, DESMODUR (registered trademark) N, and DESMODUR (registered trademark) HL from COVESTRO, and the like (all of the above are trade names).

In a case where the composition for forming a magnetic layer contains the curing agent, the composition may contain only one kind of curing agent or two or more kinds of curing agents.

As the curing agent, commercial products can be used.

In a case where the composition for forming a magnetic layer contains the curing agent, the content of the curing agent in the composition for forming a magnetic layer can be set to be greater than 0 parts by mass and equal to or smaller than 80 parts by mass with respect to 100 parts by mass of the binder. From the viewpoint of improving the hardness of the magnetic layer, the content of the curing agent can be set to be 10 parts by mass to 80 parts by mass with respect to 100 parts by mass of the binder.

—Solvent—

It is preferable that the composition for forming a magnetic layer contains a solvent.

The solvent can make a contribution as a dispersant for the powder of the ε-iron oxide-based compound, the binder, the abrasive, and the like.

The solvent may be a single solvent or a mixed solvent constituted with two or more kinds of solvents.

As the solvent, an organic solvent is preferable.

As the organic solvent, it is possible to use a ketone-based compound such as acetone, methyl ethyl ketone, methyl isobutyl ketone, diisobutyl ketone, cyclohexanone, isophorone, or tetrahydrofuran, an alcohol-based compound such as methanol, ethanol, propanol, butanol, isobutyl alcohol, isopropyl alcohol, or methyl cyclohexanol, an ester-based compound such as methyl acetate, butyl acetate, isobutyl acetate, isopropyl acetate, ethyl lactate, or glycol acetate, a glycol ether-based compound such as glycol dimethyl ether, glycol monoethyl ether, dioxane, an aromatic hydrocarbon-based compound such as benzene, toluene, xylene, cresol, or chlorobenzene, a chlorinated hydrocarbon-based compound such as methylene chloride, ethylene chloride, carbon tetrachloride, chloroform, ethylene chlorohydrin, or dichlorobenzene, N,N-dimethylformamide, hexane, and the like.

Among these, as the organic solvent, methyl ethyl ketone, cyclohexanone, and a mixed solvent containing these at any ratio are preferable.

For example, from the viewpoint of improving the dispersibility of the powder of the ε-iron oxide-based compound and the like, a solvent having a relatively high polarity is preferable. It is preferable that the composition for forming a magnetic layer contains a solvent having a dielectric constant equal to or higher than 15 in an amount equal to or greater than 50% by mass with respect to the total mass of solvents. Furthermore, a solubility parameter of the solvent is preferably 8 to 11.

[Step II]

The manufacturing method of a magnetic recording medium of the present disclosure includes a step of applying the composition for forming a magnetic layer onto a non-magnetic support after the step I so as to form a layer of the composition for forming a magnetic layer (that is, a step II).

The step II can be performed, for example, by coating the non-magnetic support, which is running, with the composition for forming a magnetic layer so as to obtain a predetermined film thickness.

In the present disclosure, "non-magnetic support" means a support satisfying at least one of the remanent flux density equal to or lower than 10 mT or coercivity equal to or lower than 7.98 kA/m (100 Oe).

As the non-magnetic support, known non-magnetic supports used in magnetic recording media can be used without particular limitation.

The material of the non-magnetic support can be appropriately selected from materials without magnetism according to the type of the magnetic recording medium in consideration of the physical properties such as molding properties, durability, and the like.

Examples of the material of the non-magnetic support include materials such as a resin material which does not contain a magnetic material and an inorganic material without magnetism.

Examples of the resin material include polyester such as polyethylene terephthalate (PET) or polyethylene naphthalate (PEN), polyolefin such as polyethylene or polypropylene, a polyamide-based resin such as polyamide, polyamide imide, or aromatic polyamide containing polyaramid, polyimide, cellulose triacetate (TAC), polycarbonate (PC), polysulfone, polybenzoxasole, and the like.

Among these, as the resin material, from the viewpoint of excellent hardness and durability and ease of processing, at least one material selected from the group consisting of polyester and a polyamide-based resin is preferable, and at least one material selected from the group consisting of polyethylene terephthalate (PET), polyethylene naphthalate (PEN), and polyamide is more preferable.

The non-magnetic support is selected according to the way the magnetic recording medium is used.

For example, in a case where the magnetic recording medium is used in the form of a magnetic tape, a flexible disk, or the like, as the non-magnetic support, a flexible resin film (or resin sheet) can be used.

In a case where a resin film is used as the non-magnetic support, the resin film may be a non-stretched resin film or a stretched film which is uniaxially or biaxially stretched. For example, in a case where a polyester film is used as the non-magnetic support, from the viewpoint of improving the dimensional stability, a biaxially stretched polyester film may be used.

The resin film used as the non-magnetic support may have a laminated structure including two or more layers. For examples, as described in JP1991-224127A (JP-H03-224127A), in order to change surface roughness between a surface on which a magnetic layer will be formed and a surface on which a magnetic layer will not be formed, a non-magnetic support obtained by laminating two layers of different films can also be used.

If necessary, for example, for the purpose of improving the adhesiveness with respect to the magnetic layer to be provided on a surface of the non-magnetic support, a surface treatment such as corona discharge, a plasma treatment, an easy adhesion treatment, or a heat treatment may be performed in advance on the non-magnetic support. Furthermore, for example, in order to inhibit foreign substances from being mixed into the magnetic layer, a surface treatment such as a dust protection treatment may be performed on the non-magnetic support.

These surface treatments can be performed by known methods.

The thickness of the non-magnetic support is not particularly limited, and is appropriately selected according to the way the magnetic recording medium is used.

The thickness of the non-magnetic support is preferably 2.0 µm to 80.0 µm and more preferably 3.0 µm to 50.0 µm, for example.

In a case where the thickness of the non-magnetic support is equal to or greater than 2.0 µm, film formability becomes excellent, and higher hardness can be obtained.

In a case where the thickness of the non-magnetic support is equal to or smaller than 80.0 µm, the total thickness of a magnetic tape does not unnecessarily increase.

In a case where the magnetic recording medium is used in the form of a magnetic tape, the thickness of the non-magnetic support is preferably 2.0 µm to 20.0 µm, and more preferably 3.0 µm to 10.0 µm.

The non-magnetic support can be coated with the composition for forming a magnetic layer by known methods such as an air doctor coating, blade coating, rod coating, extrusion coating, air knife coating, squeeze coating, immersion coating, reverse roll coating, transfer roll coating, gravure coating, kiss coating, cast coating, spray coating, and spin coating.

Regarding the coating method, for example, "Latest Coating Techniques" (May 31, 1983) published from SOGO GIJUTSU CENTER can be referred to.

The amount of the composition for forming a magnetic layer used for coating is not particularly limited.

According to a saturated magnetization amount of a magnetic head used for the magnetic recording medium, a head gap length, a recording signal bandwidth, and the like, the amount of the composition for forming a magnetic layer used for coating is appropriately adjusted such that the magnetic layer has the desired thickness.

The composition for forming a magnetic layer is used for coating, preferably in an amount that makes the magnetic layer have a thickness of 10 nm to 150 nm after drying, more preferably in an amount that makes the magnetic layer have a thickness of 20 nm to 120 nm after drying, and even more preferably in an amount that makes the magnetic layer have a thickness of 30 nm to 100 nm after drying.

In a case where the thickness of the magnetic layer is equal to or greater than 10 nm, the recording density can be further improved.

In a case where the thickness of the magnetic layer is equal to or smaller than 150 nm, noise is further reduced, and electromagnetic conversion characteristics are further improved.

[Step III]

The manufacturing method of a magnetic recording medium of the present disclosure includes a step (that is, a step III) of subjecting the formed layer of the composition for forming a magnetic layer to a magnetic field alignment treatment after the step II.

In a case where the non-magnetic support of the formed layer of the composition for forming a magnetic layer is in the form of a film such as a magnetic tape, a magnetic field alignment treatment can be performed on the powder of the ε-iron oxide-based compound contained in the composition for forming a magnetic layer by using a cobalt magnet, a solenoid, or the like.

As the method of the magnetic field alignment treatment, methods of using known random alignment apparatuses, such as a method of obliquely and alternately arranging cobalt magnets and a method of applying alternating magnetic fields by using a solenoid, are preferable. Furthermore, by vertically aligning magnetic fields by using a known method such as a method of using magnets with the opposite poles facing each other, isotropic magnetic characteristics can be imparted along a circumferential direction. Particularly, in a case where high-density recording is performed, vertical alignment is preferable. In addition, magnetic fields can be aligned along a circumferential direction by spin coating.

It is preferable that the magnetic field alignment treatment is performed before the formed layer of the composition for forming a magnetic layer is dried.

The magnetic field alignment treatment can be performed by a vertical alignment treatment in which a magnetic field with a magnetic field intensity of 0.1 T to 1.0 T is applied in a direction perpendicular to the surface coated with the composition for forming a magnetic layer.

[Step IV]

The manufacturing method of a magnetic recording medium of the present disclosure includes a step (that is, a step IV) of drying the layer of the composition for forming a magnetic layer having undergone the magnetic field alignment treatment after the step III so as to form a magnetic layer.

The drying of the layer of the composition for forming a magnetic layer can be controlled by the temperature and the amount of drying air and the coating speed.

The coating speed is preferably set to be 20 m/min to 1,000 m/min for example.

The temperature of the drying air is preferably equal to or higher than 60° C. for example.

Before the application of the magnetic field, the layer of the composition for forming a magnetic layer may be appropriately pre-dried.

[Step V]

It is preferable that the manufacturing method of a magnetic recording medium of the present disclosure includes a step (that is, a step V) of subjecting the non-magnetic support having the magnetic layer to a calender treatment after the step I, the step II, the step III, and the step IV.

The non-magnetic support having the magnetic layer can be wound up around a winding roll and then wound off the winding roll so as to be subjected to the calender treatment.

By the calender treatment, the surface smoothness is improved, the holes that occur due to the removal of solvents at the time of drying disappear, and accordingly, the filling rate of the powder of the ε-iron oxide-based compound in the magnetic layer is improved. Therefore, a magnetic recording medium with high electromagnetic conversion characteristics (for example, SNR) can be obtained.

It is preferable to perform the step V by changing the calender treatment conditions according to the surface smoothness of the magnetic layer.

In the calender treatment, for example, a super calender roll can be used.

As the calender roll, it is possible to use a heat-resistant plastic roll formed of a resin such as an epoxy-based resin, a polyimide-based resin, a polyamide-based resin, or a polyamide imide-based resin. Furthermore, a metal roll can also be used for the treatment.

Regarding the calender treatment conditions, the surface temperature of the calender roll can be set to be 60° C. to 120° C. and preferably set to be 80° C. to 100° C. for example, and the pressure (so-called line pressure) can be set to be 100 kg/cm to 500 kg/cm (98 kN/m to 490 kN/m) and preferably set to be 200 kg/cm to 450 kg/cm (196 kN/m to 441 kN/m) for example.

[Step VI]

If necessary, the manufacturing method of a magnetic recording medium of the present disclosure can include a step (that is, a step VI) of forming an optional layer such as a non-magnetic layer or a backcoat layer.

The non-magnetic layer is a layer which contributes to thinning of the magnetic layer. The non-magnetic layer can be provided between the non-magnetic support and the magnetic layer.

The backcoat layer is a layer which contributes to running stability and the like. The backcoat layer can be provided on a surface of the non-magnetic support that is opposite to the magnetic layer side.

The non-magnetic layer and the backcoat layer can be formed by preparing compositions for forming these layers (so-called composition for forming a non-magnetic layer and composition for forming a backcoat layer) and then performing the same steps as the step II and the step IV carried out for forming the magnetic layer.

The non-magnetic layer includes a layer without magnetism and a substantially non-magnetic layer containing a small amount of ferromagnetic substance (for example, a powder of an ε-iron oxide-based compound) which is an impurity or an intentionally added substance.

In the present disclosure, "non-magnetic layer" means a layer which satisfies at least one of the remanent flux density equal to or lower than 10 mT or coercivity equal to or lower than 7.98 kA/m (100 Oe).

(Composition for Forming Non-Magnetic Layer)

—Non-Magnetic Particles—

It is preferable that the composition for forming a non-magnetic layer contains non-magnetic particles.

The non-magnetic particles can function as a filler.

In the present disclosure, "non-magnetic particles" mean particles which satisfy at least one of the remanent flux density equal to or lower than 10 mT or coercivity equal to or lower than 7.98 kA/m (100 Oe).

The non-magnetic particles may be inorganic particles or organic particles.

As the non-magnetic particles, carbon black can also be used.

Examples of the inorganic particles include particles of a metal, a metal oxide, a metal carbonate, a metal sulfate, a metal nitride, a metal carbide, a metal sulfide, and the like.

Specifically, examples of the non-magnetic particles include a titanium oxide such as titanium dioxide, cerium oxide, tin oxide, tungsten oxide, ZnO, $ZrO_2$, $SiO_2$, $Cr_2O_3$, ca-alumina with an a transformation rate equal to or higher than 90%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, titanium carbide, and the like.

Among these, α-iron oxide is preferable as the non-magnetic particles.

The shape of the non-magnetic particles is not particularly limited, and may be any of a needle shape, a spherical shape, a polyhedral shape, or a plate shape.

The average particle diameter of the non-magnetic particles is preferably 5 nm to 500 nm and more preferably 10 nm to 200 nm for example.

In a case where the average particle diameter of the non-magnetic particles is within the above range, the dispersibility of the non-magnetic particles is further improved, and the surface roughness of the formed non-magnetic layer can be more suitably adjusted.

By combining non-magnetic particles having different average particle diameters or adjusting the particle size distribution of the non-magnetic particles, the dispersibility of the non-magnetic particles and the surface roughness of the non-magnetic layer can be more suitably adjusted.

The average particle diameter of the non-magnetic particles is a value measured using a transmission electron microscope (TEM).

The BET specific surface area of the non-magnetic particles is preferably 50 $m^2$/g to 150 $m^2$/g for example.

In a case where the composition for forming a non-magnetic layer contains the non-magnetic particles, the composition may contain only one kind of non-magnetic particles or two or more kinds of non-magnetic particles.

The non-magnetic particles are available as commercial products or can be manufactured by known methods.

In a case where the composition for forming a non-magnetic layer contains the non-magnetic particles, the content rate of the non-magnetic particles in the composition for forming a non-magnetic layer is preferably 50% by mass to 90% by mass, and more preferably 60% by mass to 90% by mass, with respect to the amount of solid contents in the composition for forming a non-magnetic layer.

—Binder—

It is preferable that the composition for forming a non-magnetic layer contains a binder.

The binder in the composition for forming a non-magnetic layer has the same definition as the binder described above in the section of the composition for forming a magnetic layer, and preferred aspects thereof are also the same. Therefore, the binder will not be described herein.

—Other Additives—

If necessary, the composition for forming a non-magnetic layer may contain various additives (that is, other additives) in addition to the non-magnetic particles and the binder described above.

Those other additives in the composition for forming a non-magnetic layer have the same definition as other additives described in the section of the composition for forming a magnetic layer, and preferred aspects thereof are also the same. Therefore, those other additives will not be described herein.

The amount of the composition for forming a non-magnetic layer used for coating is not particularly limited.

The composition for forming a non-magnetic layer is used for coating, preferably in an amount that makes the non-magnetic layer have a thickness of 0.05 μm to 3.0 μm after drying, more preferably in an amount that makes the non-magnetic layer have a thickness of 0.05 μm to 2.0 μm after drying, and even more preferably in an amount that makes the non-magnetic layer have a thickness of 0.05 μm to 1.5 μm after drying.

(Composition for Forming Hardcoat Layer)

—Non-Magnetic Particles—

It is preferable that the composition for forming a hardcoat layer contains non-magnetic particles.

The non-magnetic particles in the composition for forming a hardcoat layer have the same definition as the non-magnetic particles described above in the section of the composition for forming a non-magnetic layer, and preferred aspects thereof are also the same. Therefore, the non-magnetic particles will not be described herein.

—Binder—

It is preferable that the composition for forming a backcoat layer contains a binder.

The binder in the composition for forming a backcoat layer has the same definition as the binder described above in the section of the composition for forming a magnetic layer, and preferred aspects thereof are also the same. Therefore, the binder will not be described herein.

—Other Additives—

If necessary, the composition for forming a backcoat layer may contain various additives (that is, other additives) in addition to the non-magnetic particles and the binder described above.

Those other additives in the composition for forming a hardcoat layer have the same definition as other additives described above in the section of the composition for forming a magnetic layer, and preferred aspects thereof are also the same. Therefore, those other additives will not be described herein.

The amount of the composition for forming a backcoat layer used for coating is not particularly limited.

The composition for forming a backcoat layer is used for coating, preferably in an amount that makes the backcoat layer have a thickness equal to or smaller than 0.9 μm after drying, and more preferably in an amount that makes the backcoat layer have a thickness of 0.1 μm to 0.7 μm after drying.

[Magnetic Recording Medium]

The magnetic recording medium obtained by the manufacturing method of the present disclosure has at least a non-magnetic support and a magnetic layer which is provided on at least one surface of the non-magnetic support and contains the powder of the ε-iron oxide-based compound manufactured using the powder of the β-iron oxyhydroxide-based compound of the present disclosure.

The magnetic recording medium obtained by the manufacturing method of the present disclosure has the magnetic layer which contains the powder of the ε-iron oxide-based compound derived from the powder of the β-iron oxyhydroxide-based compound of the present disclosure. Therefore, the magnetic recording medium has excellent SNR and is excellent in the film hardness of the magnetic layer.

[Recording Method for Magnetic Recording Medium]

The recording method for the magnetic recording medium of the present disclosure may be a helical scan recording method or a linear recording method, and is preferably a linear recording method.

The magnetic recording medium of the present disclosure is excellent in SNR and the film hardness of a magnetic layer. Therefore, the magnetic recording medium is suited for a linear recording method.

It is preferable that the magnetic recording medium of the present disclosure is used for electromagnetic wave-assisted recording.

In the magnetic recording medium of the present disclosure, the powder of the ε-iron oxide-based compound is used as a magnetic material. Because the powder of the ε-iron oxide-based compound has extremely high coercivity, it is difficult for the powder to cause spin inversion. To the magnetic recording medium of the present disclosure, so-called electromagnetic wave-assisted recording is applied in which the powder of the ε-iron oxide-based compound contained in the magnetic layer is irradiated with electromagnetic waves so as to perform recording while causing spin to perform precession and inverting the spin by a magnetic field. In this way, it is possible to excellently perform recording by easily inverting spin only at the time of recording.

EXAMPLES

Hereinafter, the present invention will be more specifically described based on examples, but the present invention is not limited to the following examples as long as the gist of the present invention is maintained.

<Preparation of Powder of ε-Iron Oxide-Based Compound>

—Preparation of Magnetic Powder 1—

[Step (A)]

Iron (III) nitrate nonahydrate (8.8 g), 1.6 g of gallium (III) nitrate octahydrate, 227.0 mg of cobalt (II) nitrate hexahydrate, and 172.0 mg of titanium (IV) sulfate were added to 100.0 g of pure water and then stirred using a magnetic stirrer, thereby obtaining an aqueous solution A containing a compound having trivalent iron ions.

In the air atmosphere, the aqueous solution A was stirred using a magnetic stirrer under the condition of a liquid temperature of 25° C. (reaction temperature). A 25% by mass aqueous ammonia solution (alkali agent, 4.0 g) was added to the aqueous solution A being stirred, and then the solution was stirred for 2 hours while keeping the liquid temperature at 25° C., thereby obtaining a dispersion liquid of a powder of an iron oxyhydroxide-based compound.

[Step (B)]

As a surface modifier, 1.0 g of dopamine hydrochloride was added to the dispersion liquid of the powder of the iron oxyhydroxide-based compound obtained in the step (A), and then the dispersion liquid was stirred for 5 minutes, thereby obtaining a liquid B. The obtained liquid B was subjected to a centrifugation treatment for 2 hours at 40,000 rpm, and then the supernatant was removed, thereby obtaining a precipitate A. Pure water (200 mL) was added to the obtained precipitate A, a centrifugation treatment was performed again for 2 hours at 40,000 rpm, and then the supernatant was removed, thereby obtaining a precipitate B. Pure water (1,000 mL) was added to the obtained precipitate B, and then an ultrasonic treatment was performed for 30 minutes, thereby obtaining an iron oxyhydroxide-based compound sol 1 in which the powder of the iron oxyhydroxide-based compound containing particles whose surface was modified with the surface modifier was dispersed in water.

[Step (C)]

The iron oxyhydroxide-based compound sol 1 obtained in the step (B) (1,000 g) was heated to 70° C. Then, while the sol was being stirred at the same liquid temperature, 60 mL of tetraethoxysilane (TEOS) was added dropwise thereto, and the sol was stirred for 24 hours, thereby obtaining a dispersion liquid of a precursor powder.

[Step (D)]

The dispersion liquid of a precursor powder obtained in the step (C) was subjected to a centrifugation treatment for 5 minutes at 3,000 rpm, and the supernatant was removed, thereby obtaining a precipitate C. The obtained precipitate C was washed with pure water and then dried for 24 hours at 90° C., thereby obtaining a precursor powder.

[Step (E)]

The precursor powder obtained in the step (D) was loaded on the inside of a furnace and subjected to a heat treatment for 4 hours at 1,030° C. in the air atmosphere, thereby obtaining a heat-treated powder.

[Step (F)]

The heat-treated powder obtained in the step (E) was put into an 8 mol/L aqueous sodium hydroxide (NaOH) solution, and the solution was stirred for 24 hours at a liquid temperature kept at 80° C., thereby removing a Si-containing coat remaining on the particles of the heat-treated powder. Then, by a centrifugation treatment, a precipitate was collected.

[Step (G)]

The collected precipitate was washed with pure water and then dried at 90° C., thereby obtaining a magnetic powder 1.

—Preparation of Magnetic Powder 2—

[Step (A)]

By performing the same operation as that in the step (A) in Preparation of magnetic powder 1, a dispersion liquid of a powder of an iron oxyhydroxide-based compound was obtained.

[Step (B)]

An iron oxyhydroxide-based compound sol 2 was obtained by performing the same operation as that in the step (B) in Preparation of magnetic powder 1, except that the surface modifier was changed to "1.0 g of arginine" from "1.0 g of dopamine hydrochloride".

[Step (C) to step (G)]

A magnetic powder 2 was obtained by performing the same operation as that in the step (C) to the step (G) in Preparation of magnetic powder 1, except that "iron oxyhydroxide-based compound sol 1" in the step (C) was changed to "iron oxyhydroxide-based compound sol 2".

—Preparation of Magnetic Powder 3—

A dispersion liquid of a powder of an iron oxyhydroxide-based compound was obtained by performing the same operation as that in the step (A) in Preparation of magnetic powder 1.

[Step (B)]

An iron oxyhydroxide-based compound sol 3 was obtained by performing the same operation as that in the step (B) in Preparation of magnetic powder 1, except that the surface modifier was changed to "1.1 g of adrenaline hydrochloride" from "1.0 g of dopamine hydrochloride".

[Step (C) to Step (G)]

A magnetic powder 3 was obtained by performing the same operation as that in the step (C) to the step (G) in Preparation of magnetic powder 1, except that "iron oxyhydroxide-based compound sol 1" in the step (C) was changed to "iron oxyhydroxide-based compound sol 3".

—Preparation of Magnetic Powder 4—

[Step (A)]

A dispersion liquid of a powder of an iron oxyhydroxide-based compound was obtained by performing the same operation as that in the step (C) in Preparation of magnetic powder 1.

[Step (B)]

An iron oxyhydroxide-based compound sol 4 was obtained by performing the same operation as that in the step (B) in Preparation of magnetic powder 1, except that the surface modifier was changed to "1.3 g of isoproterenol hydrochloride" from "1.0 g of dopamine hydrochloride".

[Step (C) to Step (G)]

A magnetic powder 4 was obtained by performing the same operation as that in the step (C) to the step (G) in Preparation of magnetic powder 1, except that "iron oxyhydroxide-based compound sol 1" in the step (C) was changed to "iron oxyhydroxide-based compound sol 4".

—Preparation of Magnetic Powder 5—

A dispersion liquid of a powder of an iron oxyhydroxide-based compound was obtained by performing the same operation as that in the step (A) in Preparation of magnetic powder 4, except that 8.9 g of iron (III) nitrate nonahydrate, 1.4 g of aluminum (III) nitrate nonahydrate, 227.0 mg of cobalt (II) nitrate hexahydrate, and 172.0 mg of titanium (IV) sulfate were added to 100.0 g of pure water and then stirred using a magnetic stirrer so as to obtain an aqueous solution A containing a compound having trivalent iron ions.

[Step (B)]

An iron oxyhydroxide-based compound sol 5 was obtained by performing the same operation as that in the step (B) in Preparation of magnetic powder 4.

[Step (C) to Step (G)]

A magnetic powder 5 was obtained by performing the same operation as that in the step (C) to the step (G) in Preparation of magnetic powder 4, except that "iron oxyhydroxide-based compound sol 4" in the step (C) was changed to "iron oxyhydroxide-based compound sol 5".

—Preparation of Magnetic Powder 6—

[Step (A)]

A dispersion liquid of a powder of an iron oxyhydroxide-based compound was obtained by performing the same operation as that in the step (A) in Preparation of magnetic powder 4, except that 7.9 g of iron (III) nitrate nonahydrate and 3.1 g of gallium (III) nitrate octahydrate were added to 100.0 g of pure water and stirred using a magnetic stirrer so as to obtain an aqueous solution A containing a compound having trivalent iron ions.

[Step (B)]

An iron oxyhydroxide-based compound sol 6 was obtained by performing the same operation as that in the step (B) in Preparation of magnetic powder 4.

[Step (C) to Step (G)]

A magnetic powder 6 was obtained by performing the same operation as that in the step (C) to the step (G) in Preparation of magnetic powder 4, except that "iron oxyhydroxide-based compound sol 4" in the step (C) was changed to "iron oxyhydroxide-based compound sol 6".

—Preparation of Magnetic Powder 7—

[Step (A)]

A dispersion liquid of a powder of an iron oxyhydroxide-based compound was obtained by performing the same operation as that in the step (A) in Preparation of magnetic powder 4, except that 8.3 g of iron (III) nitrate nonahydrate, 2.3 g of gallium (III) nitrate octahydrate, 159.0 mg of cobalt (II) nitrate hexahydrate, and 121.0 mg of titanium (IV) sulfate were added to 100.0 g of pure water and stirred using a magnetic stirrer so as to obtain an aqueous solution A containing a compound having trivalent iron ions.

[Step (B)]

An iron oxyhydroxide-based compound sol 7 was obtained by performing the same operation as that in the step (B) in Preparation of magnetic powder 4.

[Step (C) to Step (G)]

A magnetic powder 7 was obtained by performing the same operation as that in the step (C) to the step (G) in Preparation of magnetic powder 4, except that "iron oxyhydroxide-based compound sol 4" in the step (C) was changed to "iron oxyhydroxide-based compound sol 7".

—Preparation of Magnetic Powder 8—

[Step (A) and Step (B)]

An iron oxyhydroxide-based compound sol 4 was obtained by performing the same operation as that in the step (A) and the step (B) in Preparation of magnetic powder 4.

[Step (C) to Step (G)]

A magnetic powder 8 was obtained by performing the same operation as that in the step (C) to the step (G) in Preparation of magnetic powder 4, except that the temperature of the heat treatment in the step (E) was changed to "1,015° C." from "1,030° C.".

—Preparation of Magnetic Powder 9—

[Step (A) and Step (B)]

An iron oxyhydroxide-based compound sol 4 was obtained by performing the same operation as that in the step (A) and the step (B) in Preparation of magnetic powder 4.

[Step (C) to Step (G)]

A magnetic powder 9 was obtained by performing the same operation as that in the step (C) to the step (G) in Preparation of magnetic powder 4, except that the temperature of the heat treatment in the step (E) was changed to "1,050° C." from "1,030° C.".

—Preparation of Magnetic Powder 10—

[Step (A)]

A dispersion liquid of a powder of an iron oxyhydroxide-based compound was obtained by performing the same operation as that in the step (A) in Preparation of magnetic powder 1.

[Step (B)]

An iron oxyhydroxide-based compound sol 8 was obtained by performing the same operation as that in the step (B) in Preparation of magnetic powder 1, except that a surface modifier was not used.

[Step (C) to Step (G)]

A magnetic powder 10 was obtained by performing the same operation as that in the step (C) to the step (G) in Preparation of magnetic powder 1, except that "iron oxyhydroxide-based compound sol 1" in the step (C) was changed to "iron oxyhydroxide-based compound sol 8".

—Preparation of Magnetic Powder 11—

[Step (A)]

A dispersion liquid of a powder of an iron oxyhydroxide-based compound was obtained by performing the same operation as that in the step (A) in Preparation of magnetic powder 1.

[Step (B)]

An iron oxyhydroxide-based compound sol 9 was obtained by performing the same operation as that in the step (B) in Preparation of magnetic powder 1, except that the surface modifier was changed to "1.0 g of citric acid" from "1.0 g of dopamine hydrochloride".

[Step (C) to Step (G)]

A magnetic powder 11 was obtained by performing the same operation as that in the step (C) to the step (G) in Preparation of magnetic powder 1, except that "iron oxyhydroxide-based compound sol 1" in the step (C) was changed to "iron oxyhydroxide-based compound sol 9".

[Check and Measurement]

1. Crystal Structure (1) Crystal Structure of Iron Oxyhydroxide-Based Compound

By an X-ray diffraction (XRD) method, the crystal structure of each of the iron oxyhydroxide-based compounds (hereinafter, referred to as "iron oxyhydroxide-based compounds 1 to 9" respectively) forming the powder of the iron oxyhydroxide-based compound contained in the iron oxyhydroxide-based compound sols 1 to 9 was checked.

As a sample for check, a substance obtained by drying the precipitate B in the step (B) (that is, a powder of an iron oxyhydroxide-based compound) was used. As a measurement apparatus, X' Pert Pro diffractometer from Malvern PANalytical was used.

The measurement conditions are as below.

—Measurement Conditions—

X-ray source: Cu Kα ray

[wavelength: 1.54 Å (0.154 nm), power: 40 mA, 45 kV]

Scan range: 20°<2θ<70°

Scan interval: 0.05°

Scan speed: 0.75°/min

As a result, it was confirmed that all of the iron oxyhydroxide-based compounds 1 to 9 are single-phase β-iron oxyhydroxide-based compounds which have a β-type crystal structure and do not have α-type, γ-type, and δ-type crystal structures.

(2) Crystal Structure of Magnetic Substance

By the X-ray diffraction (XRD) method, the crystal structure of each of the magnetic substances (hereinafter, referred to as "magnetic substances 1 to 11" respectively) forming the magnetic powders 1 to 11 was checked.

The measurement apparatus and the measurement conditions are the same as the measurement apparatus and the measurement conditions in "(1) Crystal structure of iron oxyhydroxide-based compound" described above.

As a result, it was confirmed that all of the magnetic substances 1 to 11 are single-phase ε-iron oxide-based compounds which have an ε-type crystal structure and do not have α-type, β-type, and γ-type crystal structures.

2. Composition (1) Composition of Iron Oxyhydroxide-Based Compound

The composition of each of the iron oxyhydroxide-based compounds 1 to 9 was checked by a high-frequency Inductively Coupled Plasma (ICP) emission spectrometer.

As a sample for checking, a substance obtained by drying the precipitate B in the step (B) (that is, a powder of an iron oxyhydroxide-based compound) was used. As a measurement apparatus, ICPS-8100 (trade name) from Shimadzu Corporation was used.

Specifically, a container filled with 12 mg of the powder of the iron oxyhydroxide-based compound and 10 mL of a 4 mol/L aqueous hydrochloric acid solution was kept on a hot plate with a set temperature of 80° C. for 3 hours, thereby obtaining a solution. Pure water (30 mL) was added to the obtained solution, and then the solution was filtered using a 0.1 μm membrane filter, thereby obtaining a filtrate. For the obtained filtrate, elemental analysis was performed using the measurement apparatus described above.

Based on the obtained results of the elemental analysis, the content rate of each of the metal atoms with respect to 100 at % of iron atoms was determined. Furthermore, based on the obtained content rate, the composition of the iron oxyhydroxide-based compound was checked. The composition of each of the iron oxyhydroxide-based compounds is as below.

Iron Oxyhydroxide-Based Compounds 1 to 4, 8, and 9

$\beta\text{-Ga}_{(0.14)}\text{Co}_{(0.025)}\text{Ti}_{(0.025)}\text{Fe}_{(0.81)}\text{OOH}$

[β-iron oxyhydroxide-based compound represented by Formula (6)]

Iron Oxyhydroxide-Based Compound 5

$\beta\text{-Al}_{(0.13)}\text{Co}_{(0.025)}\text{Ti}_{(0.025)}\text{Fe}_{(0.82)}\text{OOH}$

[β-iron oxyhydroxide-based compound represented by Formula (6)]

Iron Oxyhydroxide-Based Compound 6

$\beta\text{-Ga}_{(0.275)}\text{Fe}_{(0.725)}\text{OOH}$

[β-iron oxyhydroxide-based compound represented by Formula (2)]

Iron Oxyhydroxide-Based Compound 7

$\beta\text{-Ga}_{(0.2)}\text{Co}_{(0.0175)}\text{Ti}_{(0.0175)}\text{Fe}_{(0.765)}\text{OOH}$

[β-iron oxyhydroxide-based compound represented by Formula (6)]

(2) Composition of Magnetic Substance

The composition of each of the magnetic substances 1 to 11 was checked by a high-frequency Inductively Coupled Plasma (ICP) emission spectrometry.

The measurement apparatus and the measurement conditions are the same as the measurement apparatus and the measurement conditions in "(1) Composition of iron oxyhydroxide-based compound" described above.

Based on the obtained results of the elemental analysis, the content rate of each of the metal atoms with respect to 100 at % of iron atoms was determined. Furthermore, based on the obtained content rate, the composition of the magnetic substance was checked. The composition of each of the magnetic substances is as below.

Magnetic Substances 1 to 4 and 8 to 11
$\varepsilon\text{-Ga}_{(0.28)}\text{Co}_{(0.05)}\text{Ti}_{(0.05)}\text{Fe}_{(1.62)}\text{O}_3$
[ε-iron oxide-based compound represented by Formula (6-1)]

Magnetic Substance 5
$\varepsilon\text{-Al}_{(0.26)}\text{Co}_{(0.05)}\text{Ti}_{(0.05)}\text{Fe}_{(1.64)}\text{O}_3$
[ε-iron oxide-based compound represented by Formula (6-1)]

Magnetic Substance 6
$\varepsilon\text{-Ga}_{(0.55)}\text{Fe}_{(1.45)}\text{O}_3$
[ε-iron oxide-based compound represented by Formula (2-1)]

Magnetic Substance 7
$\varepsilon\text{-Ga}_{(0.4)}\text{Co}_{(0.35)}\text{Ti}_{(0.35)}\text{Fe}_{(1.53)}\text{O}_3$
[ε-iron oxide-based compound represented by Formula (6-1)]

3. Shape (1) Shape of Particles of Iron Oxyhydroxide-Based Compound

By using a transmission electron microscope (TEM), the shape of the particles of each of the iron oxyhydroxide-based compounds 1 to 9 was observed. As a result, it was confirmed that all of the particles have a rod shape.

As a sample for check, a substance obtained by drying the precipitate B in the step (B) (that is, a powder of an iron oxyhydroxide-based compound) was used.

(2) Shape of Particles of Magnetic Substance

By using a transmission electron microscope (TEM), the shape of the particles of each of the magnetic substances 1 to 11 was observed. As a result, it was confirmed that all of the particles have a spherical shape.

4. Particle Size (1) Average Major Axis Length and Average Aspect Ratio of Powder of Iron Oxyhydroxide-Based Compound The average major axis length and the average aspect ratio (average major axis length/average minor axis length) of the powder of each of the iron oxyhydroxide-based compounds 1 to 9 were determined by the following method.

As a sample for check, a substance obtained by drying the precipitate B in the step (B) (that is, a powder of an iron oxyhydroxide-based compound) was used.

By using a transmission electron microscope (TEM) (model NO.: H-9000, Hitachi High-Technologies Corporation), the powder of the iron oxyhydroxide-based compound was imaged at 80,000× magnification and printed on printing paper at a total magnification of 500,000×. From the printed particles, primary particles were selected, and the contour of the primary particles was traced using a digitizer. The primary particles mean independent particles not being aggregated. The major axis length and the minor axis length in the traced contour were determined using image analysis software KS-400 manufactured by CARL ZEISS.

For 500 particles randomly extracted from the primary particles printed on several sheets of printing paper, the major axis length and the minor axis length were determined. For each of the determined major axis lengths and the minor axis lengths of the 500 particles, a simple average (that is, a number average) was calculated, thereby determining the average major axis length and the average aspect ratio (average major axis length/average minor axis length). The results are as below.

Particles of iron oxyhydroxide-based compound 1 (average major axis length: 11.3 nm, average aspect ratio: 3.8), particles of iron oxyhydroxide-based compound 2 (average major axis length: 15.4 nm, average aspect ratio: 4.3), particles of iron oxyhydroxide-based compound 3 (average major axis length: 11.1 nm, average aspect ratio: 3.8), particles of iron oxyhydroxide-based compound 4 (average major axis length: 10.7 nm, average aspect ratio: 3.7), particles of iron oxyhydroxide-based compound 5 (average major axis length: 10.7 nm, average aspect ratio: 3.6), particles of iron oxyhydroxide-based compound 6 (average major axis length: 11.4 nm, average aspect ratio: 3.8), particles of iron oxyhydroxide-based compound 7 (average major axis length: 10.9 nm, average aspect ratio: 3.8), particles of iron oxyhydroxide-based compound 8 (average major axis length: 10.7 nm, average aspect ratio: 3.7), particles of iron oxyhydroxide-based compound 9 (average major axis length: 10.7 nm, average aspect ratio: 3.7)

(2) Average Equivalent Circular Diameter of Powder of Magnetic Substance

The average equivalent circular diameter of the powder of each of the magnetic substances 1 to 11 was determined by the same method as that in "(1) Equivalent circular diameter of powder of iron oxyhydroxide-based compound" described above. The results are as below.

Magnetic substance 1: 13.3 nm, magnetic substance 2: 13.4 nm, magnetic substance 3: 13.3 nm, magnetic substance 4: 13.2 nm, magnetic substance 5: 13.4 nm, magnetic substance 6: 13.5 nm, magnetic substance 7: 13.4 nm, magnetic substance 8: 10.8 nm, magnetic substance 9: 17.8 nm, magnetic substance 10: 13.5 nm, magnetic substance 11: 13.3 nm 5. Zeta Potential of Powder of Iron Oxyhydroxide-Based Compound By using the iron oxyhydroxide-based compound sols 1 to 9, the zeta potential of the powder of the iron oxyhydroxide-based compound at pH 10 was measured. Specifically, the zeta potential was measured as below.

The liquid temperature of each of the iron oxyhydroxide-based compound sols was adjusted to be 25° C. In a state where the liquid temperature was being kept as it was, pH of each of the iron oxyhydroxide-based compound sols was adjusted to be 10 by using an aqueous ammonia solution, thereby obtaining a sample for measurement. The zeta potential of the obtained sample for measurement was measured using a zeta potential analyzer (trade name: ZETASIZER NANO ZS, Malvern Panalytical Ltd.). The results are shown in Table 1.

[Preparation of Magnetic Recording Medium (Magnetic Tape)]

Examples 1 to 9 and Comparative Examples 1 and 2

1. Preparation of Composition for Forming Magnetic Layer A composition for forming a magnetic layer having the following makeup was prepared by the following method.

First, the components of a magnetic liquid having the following composition were dispersed for 24 hours by using a batch-type vertical sand mill and zirconia beads (first dispersion beads, density: 6.0 g/cm³) having a bead size of 0.5 mmϕ (first dispersion).

Then, the dispersion obtained by the first dispersion was filtered using a filter having an average pore size of 0.5 µm, thereby obtaining a dispersion liquid A. In the first dispersion, the amount of zirconia beads (first dispersion beads) used was 1,000% of the amount of the magnetic powder based on mass.

Thereafter, the dispersion liquid A was dispersed for 1 hour by using a batch-type vertical sand mill and diamond beads (second dispersion beads, density: 3.5 g/cm³) having a bead size of 500 nmϕ (second dispersion).

Subsequently, by using a centrifuge, a centrifugation treatment was performed on the dispersion obtained by the second dispersion, thereby obtaining a dispersion liquid B. The obtained dispersion liquid B was used as a magnetic liquid.

Then, the components of an abrasive liquid having the following composition were dispersed for 2 hours by using a horizontal beads mill and zirconia beads having a bead size of 0.3 mmϕ. During the dispersion, the zirconia beads used were adjusted such that the filling rate of the beads became 80% by volume.

Thereafter, by using a flow-type ultrasonic dispersion filtration apparatus, an ultrasonic dispersion filtration treatment was performed on the dispersion obtained by dispersion, thereby obtaining an abrasive liquid.

Subsequently, the magnetic liquid and the abrasive liquid prepared as above and a liquid containing a non-magnetic filler, a lubricant, and a curing agent having the following composition were put into a dissolver stirrer and stirred for 30 minutes at a circumferential speed of 10 m/s (second).

Then, by using a flow-type ultrasonic disperser, the liquid obtained by stirring was treated 3 passes at a flow rate of 7.5 kg/min. Thereafter, the liquid was filtered using a filter having an average pore size of 1 µm, thereby obtaining a composition for forming a magnetic layer (step I).

<Makeup of Composition for Forming Magnetic Layer>

| -Magnetic liquid- | |
|---|---|
| Magnetic powder | 100.0 parts by mass |
| (magnetic powders 1 to 11 prepared as above) | |
| Oleic acid (lubricant) | 2.0 parts by mass |
| Vinyl chloride resin (binder) | 10.0 parts by mass |
| (trade name: MR-104, ZEON CORPORATION) | |
| SO₃Na group-containing polyurethane resin (binder) (weight-average molecular weight: 70,000, SO₃Na group: 0.07 meq/g) | 4.0 parts by mass |
| Methyl ethyl ketone (organic solvent) | 150.0 parts by mass |
| Cyclohexanone (organic solvent) | 150.0 parts by mass |
| -Abrasive liquid- | |
| α-Alumina (abrasive) (BET specific surface area: 19 m²/g, Mohs hardness: 9) | 6.0 parts by mass |
| SO₃Na group-containing polyurethane resin (binder) (weight-average molecular weight: 70,000, SO₃Na group: 0.1 meq/g) | 0.6 parts by mass |
| 2,3-Dihydroxynaphthalene (dispersant) | 0.6 parts by mass |
| Cyclohexanone (organic solvent) | 23.0 parts by mass |
| -Non-magnetic filler liquid- | |
| Colloidal silica (non-magnetic filler) (average particle diameter: 120 nm) | 2.0 parts by mass |
| Methyl ethyl ketone (organic solvent) | 8.0 parts by mass |
| -Liquid containing lubricant and curing agent- | |
| Stearic acid (lubricant) | 3.0 parts by mass |
| Stearic acid amide (lubricant) | 0.3 parts by mass |
| Butyl stearate (lubricant) | 6.0 parts by mass |
| Polyisocyanate (curing agent) (trade name: CORONATE (registered trademark) L, Tosoh Corporation) | 3.0 parts by mass |
| Methyl ethyl ketone (organic solvent) | 110.0 parts by mass |
| Cyclohexanone (organic solvent) | 110.0 parts by mass |

2. Preparation of Composition for Forming Non-Magnetic Layer

A composition for forming a non-magnetic layer having the following makeup was prepared by the following method.

First, the components of the composition for forming a non-magnetic layer having the following composition were dispersed for 24 hours by using a batch-type vertical sand mill and zirconia beads having a bead size of 0.1 mmϕ.

Then, the dispersion obtained by dispersion was filtered using a filter having an average pore size of 0.5 µm, a composition for forming a non-magnetic layer was obtained.

<Makeup of Composition for Forming Non-Magnetic Layer>

| | |
|---|---|
| α-Iron oxide (non-magnetic filler) (average particle diameter (average major axis length): 10 nm, average aspect ratio: 1.9, BET specific surface area: 75 m²/g) | 100.0 parts by mass |
| Carbon black (non-magnetic filler) (average particle diameter: 20 nm) | 25.0 parts by mass |
| SO₃Na group-containing polyurethane resin (binder) (weight-average molecular weight: 70,000, SO₃Na group: 0.2 meq/g) | 18.0 parts by mass |
| Stearic acid (lubricant) | 1.0 part by mass |
| Methyl ethyl ketone (organic solvent) | 300.0 parts by mass |
| Cyclohexanone (organic solvent) | 300.0 parts by mass |

3. Preparation of Composition for Forming Backcoat Layer

A composition for forming a backcoat layer having the following makeup was prepared by the following method.

First, the components of the composition for forming a backcoat layer having the following makeup except for stearic acid and butyl stearate as lubricants, polyisocyanate as a curing agent, and cyclohexanone (A) were kneaded and diluted using an open kneader. For dilution, a mixed solvent of methyl ethyl ketone and cyclohexanone was used.

Then, the substance obtained by kneading and dilution was dispersed using a horizontal beads mill and zirconia beads having a bead size of 1 mmϕ (first dispersion). During the first dispersion, the zirconia beads used was adjusted such that the filling rate of the beads became 80% by volume. Furthermore, during the first dispersion, the circumferential speed of a rotor tip of the horizontal beads mill was set to be 10 m/s (second), and the dispersion treatment was performed 12 passes by setting a retention time per 1 pass to be 2 minutes.

Thereafter, the remaining components (that is, stearic acid and butyl stearate as lubricants, polyisocyanate as a curing agent, and cyclohexanone (A)) were added to the dispersion obtained by the first dispersion, and stirred using a dissolver stirrer.

Subsequently, the dispersion obtained by stirring was filtered using a filter having an average pore size of 1 µm, thereby obtaining a composition for forming a backcoat layer.

<Makeup of Composition for Forming Backcoat Layer>

| | |
|---|---|
| α-Iron oxide (non-magnetic filler) (average particle diameter (average major axis length): 0.15 µm, average aspect ratio: 7, BET specific surface area: 52 m²/g) | 80.0 parts by mass |
| Carbon black (non-magnetic filler) (average particle diameter: 20 nm) | 20.0 parts by mass |
| Vinyl chloride resin (binder) (trade name: MR-104, ZEON CORPORATION) | 13.0 parts by mass |

-continued

| | |
|---|---|
| SO₃Na group-containing polyurethane resin (binder) (weight-average molecular weight: 50,000, SO₃Na group: 0.07 meq/g) | 6.0 parts by mass |
| Phenylphosphonic acid (surface modifier) | 3.0 parts by mass |
| Methyl ethyl ketone (organic solvent; for dilution) | 155.0 parts by mass |
| Cyclohexanone (organic solvent; for dilution) | 155.0 parts by mass |
| Stearic acid (lubricant) | 3.0 parts by mass |
| Butyl stearate (lubricant) | 3.0 parts by mass |
| Polyisocyanate (curing agent) (trade name: CORONATE (registered trademark) 3041, Tosoh Corporation) | 5.0 parts by mass |
| Cyclohexanone (A) (organic solvent) | 200.0 parts by mass |

4. Preparation of Magnetic Tape

A support made of polyethylene terephthalate having a thickness of 5.0 jam (that is, a non-magnetic support) was coated with the composition for forming a non-magnetic layer such that the thickness thereof became 100 nm after drying, and the composition was dried, thereby forming a non-magnetic layer.

Then, the formed non-magnetic layer was coated with the composition for forming a magnetic layer such that the thickness thereof became 70 nm after drying, thereby forming a layer of the composition for forming a magnetic layer (step II). While the formed layer of the composition for forming a magnetic layer is being in a wet state (so-called undried state), a vertical alignment treatment was performed by applying a magnetic field with a magnetic field intensity of 0.60 T to the layer of the composition for forming a magnetic layer in a direction perpendicular to the surface of the layer by using electromagnets disposed to face each other (step III). Thereafter, the layer of the composition for forming a magnetic layer was dried, thereby forming a magnetic layer (step IV).

Subsequently, a surface of the non-magnetic support that was opposite to a surface on which the non-magnetic layer and the magnetic layer were formed was coated with the composition for forming a backcoat layer such that the thickness thereof became 0.4 μm after drying, thereby forming a backcoat layer. In this way, a laminate constituted with hardcoat layer/non-magnetic support/non-magnetic layer/magnetic layer was obtained.

Then, by using a pair of calender rolls constituted only with metal rolls, a surface smoothing treatment (so-called calender treatment) was performed on the obtained laminate under the conditions of a calender treatment speed of 100 m/min, a line pressure of 300 kg/cm (294 kN/m), and a calender roll surface temperature of 100° C. Thereafter, a heat treatment was performed for 36 hours in an environment with an atmospheric temperature of 70° C.

After the heat treatment, the laminate was cut in a width of ½ inches (0.0127 meters), thereby obtaining a magnetic tape.

[Evaluation]
1. SFD

SFD of each of the magnetic powders (that is, magnetic powders 1 to 11) used in the magnetic tapes of Examples 1 to 9 and Comparative Examples 1 and 2 prepared as above was evaluated.

In an environment with an atmospheric temperature of 23° C., by using a vibrating sample magnetometer (manufactured by TOEI INDUSTRY CO., LTD.), the magnetic field was swept in a range of applied magnetic field±1,194 kA/m (15 kOe) so as to measure the magnetization intensity of the magnetic powder with respect to the applied magnetic field. The magnetic field sweep speed was set to be 6.7 kA/m/s (second) [84 Oe/s (second)]. Based on the magnetization curve of the magnetic powder obtained from the measurement results, a coercivity (Hc) was determined. Furthermore, based on a curve obtained by differentiating the magnetization curve, a half-width of a peak around He (hereinafter, referred to as "HPW") was determined. From the values of He and HPW, SFD was calculated by the following equation.

$$SFD = HPW/Hc$$

The results are shown in Table 1.

2. SNR

For the magnetic tapes of Examples 1 to 9 and Comparative Examples 1 and 2 prepared as above, SNR was evaluated. For the evaluation, a magnetic tape cut in a length of 100 m was used.

By using a ½-inch (0.0127-meter) reel tester to which a head was fixed, the magnetic tape was allowed to run under the following running conditions, and magnetic signals were recorded thereon on the longitudinal direction of the magnetic tape and reproduced under the following recording/reproduction conditions.

—Running Conditions—

Transport speed (relative speed of head/tape): 6.0 m/s (second)

Length per 1 pass: 1,000 m

Number of times of running: reciprocating 1,000 passes

—Recording/Reproduction Conditions—

(Recording)

Recording head: Metal-In-Gap (MIG) head

Recording track width: 1.0 μm

Recording gap: 0.15 μm

Saturated flux density of head (Bs): 1.8 T

Recording current: recording current optimal for each magnetic tape (Reproduction)

Reproducing head: Giant Magneto Resistive (GMR) effect head

Reproducing track width: 0.5 m

Distance between shields (sh) (sh-sh distance): 0.1 μm

Element thickness: 15 nm linear recording density: 270 kfci (fci: flux change per inch; the same shall be applied hereinafter.)

By using a spectrum analyzer from Shibasoku Co., Ltd., frequency analysis was performed on the reproduced signals, and a ratio between the output of 300 kfci and the noise integrated in a range of 0 kfci to 600 kfci was adopted as SNR. SNR was determined after the signals were thoroughly stabilized since the running of the magnetic tape had finished.

Whether or not SNR of the magnetic tape is good was determined based on a difference in SNR obtained using SNR of the magnetic tape of Comparative Example 1 as a reference. Specifically, a magnetic tape exhibiting SNR higher than SNR of the magnetic tape of Comparative Example 1 by equal to or higher than +1.0 dB was determined as having excellent SNR. The results are shown in Table 1.

3. Film Hardness

For the magnetic tapes of Examples 1 to 9 and Comparative Examples 1 and 2 prepared as above, film hardness was evaluated. For the evaluation, a magnetic tape cut in a length of 100 m was used.

By using a ½-inch (0.0127-meter) reel tester to which a head was fixed, the magnetic tape was allowed to run under the following running conditions in an environment with an atmospheric temperature of 37° C. and a relative humidity of 87%.

—Running Conditions—

Transport speed (relative speed of head/tape): 3.0 m/s (second)

Length per 1 pass: 100 m

Number of times of running: reciprocating 6,000 passes

After running, the surface condition of the magnetic layer was observed using an optical microscope (trade name: EclipseLV 150, Nikon Corporation) at 100× magnification, and the film hardness of the magnetic tape was evaluated according to the following standards. The results are shown in Table 1.

In the following evaluation standards, a magnetic tape having the highest film hardness was evaluated as "A", and magnetic tapes evaluated as "A", "B", or "C" were determined as being in an acceptable range for practical use.

(Evaluation Standards)

A: No sliding mark was checked.

B: Although a slight sliding mark was checked, the surface of the magnetic layer was not scraped.

C: Although the surface of the magnetic layer was slightly scraped, the film hardness was unproblematic for practical use.

D: The surface of the magnetic layer was apparently scraped, the peeling of the surface of the magnetic layer or the missing of the magnetic layer was confirmed at many sites, and accordingly, the film hardness was problematic for practical use.

E: The entire surface of the magnetic layer was scraped off, and accordingly, the film hardness was problematic for practical use.

From these results, it has been revealed that by the powder of a β-iron oxyhydroxide-based compound of the present disclosure, which is a powder of a β-iron oxyhydroxide-based compound represented by Formula (1) described above and containing particles whose surface is modified with a surface modifier and has a zeta potential equal to or higher than +5 mV at pH 10 in a case where the powder is dispersed in water to be made into a sol, a magnetic powder (that is, a powder of an ε-iron oxide-based compound) can be formed which makes it possible to manufacture a magnetic recording medium which exhibits excellent SNR and is excellent in the film hardness of a magnetic layer.

What is claimed is:

1. A powder of a β-iron oxyhydroxide-based compound that is a group of particles of a β-iron oxyhydroxide-based compound represented by Formula (1) below;

wherein a surface of the particles of the β-iron oxyhydroxide-based compound is modified with a surface modifier;

wherein, in a case where the powder is dispersed in water to be made into a sol, a zeta potential of the powder is equal to or higher than +5 mV at pH 10;

$$\beta\text{-}A_aFe_{1-a}OOH \tag{1}$$

wherein, in Formula (1), A represents at least one metallic element other than Fe, and a represents a number that satisfies a relationship of $0 \leq a < 1$, and wherein the surface modifier is at least one compound selected from the group consisting of dopamine hydrochloride, adrenaline hydrochloride, isoproterenol hydrochloride, and arginine.

2. The powder of a β-iron oxyhydroxide-based compound according to claim 1,

TABLE 1

| | Powder of β-iron oxyhydroxide-based compound | | | Powder of ε-iron oxide-based compound | | Evaluation | | |
|---|---|---|---|---|---|---|---|---|
| | Iron oxyhydroxide-based compound sol No. | Surface modifier | Zeta potential at pH 10 (mV) | Magnetic substance No. | Firing temperature (° C.) | SFD | SNR (dB) [to Comparative Example 1] | Film hardness |
| Example 1 | 1 | Dopamine hydrochloride | 10.9 | 1 | 1,030 | 1.01 | +1.8 | B |
| Example 2 | 2 | Arginine | 5.3 | 2 | 1,030 | 1.22 | +1.3 | B |
| Example 3 | 3 | Adrenalin hydrochloride | 16.1 | 3 | 1,030 | 0.97 | +2.0 | A |
| Example 4 | 4 | Isoproterenol hydrochloride | 21.3 | 4 | 1,030 | 0.88 | +2.3 | A |
| Example 5 | 5 | Isoproterenol hydrochloride | 20.4 | 5 | 1,030 | 0.94 | +1.9 | A |
| Example 6 | 6 | Isoproterenol hydrochloride | 20.7 | 6 | 1,030 | 0.90 | +1.8 | B |
| Example 7 | 7 | Isoproterenol hydrochloride | 20.4 | 7 | 1,030 | 0.93 | +1.9 | A |
| Example 8 | 4 | Isoproterenol hydrochloride | 21.3 | 8 | 1,015 | 1.12 | +2.0 | B |
| Example 9 | 4 | Isoproterenol hydrochloride | 21.3 | 9 | 1,050 | 0.76 | +1.9 | A |
| Comparative example 1 | 8 | N/A | −4.9 | 10 | 1,030 | 1.73 | +0.0 | E |
| Comparative example 2 | 9 | Citric acid | −34.2 | 11 | 1030 | 1.46 | +0.7 | D |

As shown in Table 1, all of the magnetic tapes of Examples 1 to 9 had excellent SNR and were excellent in the film hardness of the magnetic layer.

In contrast, in the magnetic tapes of Comparative Examples 1 and 2, both the SNR and film hardness of the magnetic layer were poorer than in the magnetic tapes of examples.

wherein, in Formula (1), A represents at least one metallic element selected from the group consisting of Ga, Al, In, Rh, Mn, Co, Ni, Zn, Ti, and Sn, and a represents a number that satisfies a relationship of $0 < a < 1$.

3. A β-iron oxyhydroxide-based compound sol:

wherein a powder that is a group of particles of a β-iron oxyhydroxide-based compound represented by Formula (1) below is dispersed in water;

wherein a surface of the particles of the β-iron oxyhydroxide-based compound is modified with a surface modifier;

wherein a zeta potential of the powder of the β-iron oxyhydroxide-based compound is equal to or higher than +5 mV at pH 10;

$$\beta\text{-}A_a Fe_{1-a} OOH \tag{1}$$

wherein, in Formula (1), A represents at least one metallic element other than Fe, and a represents a number that satisfies a relationship of $0 \leq a < 1$, and wherein the surface modifier is at least one compound selected from the group consisting of dopamine hydrochloride, adrenaline hydrochloride, isoproterenol hydrochloride, and arginine.

4. The β-iron oxyhydroxide-based compound sol according to claim 3, wherein, in Formula (1), A represents at least one metallic element selected from the group consisting of Ga, Al, In, Rh, Mn, Co, Ni, Zn, Ti, and Sn, and a represents a number that satisfies a relationship of $0 < a < 1$.

* * * * *